(12) United States Patent
Sasaki

(10) Patent No.: US 8,214,076 B2
(45) Date of Patent: Jul. 3, 2012

(54) ALIGNMENT ADJUSTING APPARATUS, LIBRARY APPARATUS, AND ALIGNMENT ADJUSTING METHOD

(75) Inventor: Shinobu Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 105 days.

(21) Appl. No.: 12/759,274

(22) Filed: Apr. 13, 2010

(65) Prior Publication Data

US 2010/0198395 A1 Aug. 5, 2010

Related U.S. Application Data

(63) Continuation of application No. PCT/JP2008/63057, filed on Jul. 18, 2008.

(30) Foreign Application Priority Data

Oct. 16, 2007 (WO) .................. PCT/JP2007/070201

(51) Int. Cl.
  G06F 17/00 (2006.01)
  G06F 7/00 (2006.01)
  G11B 15/00 (2006.01)

(52) U.S. Cl. .......... 700/218; 700/215; 700/245; 360/91; 901/46; 901/50

(58) Field of Classification Search .................. None
See application file for complete search history.

(56) References Cited

U.S. PATENT DOCUMENTS 5,790,338 A 8/1998 Kanai et al.
5,946,160 A 8/1999 Ohashi
5,959,866 A * 9/1999 Hanaoka et al. ............. 700/214

FOREIGN PATENT DOCUMENTS

| JP | 4-20404 | 1/1992 |
|---|---|---|
| JP | 6-99373 | 4/1994 |
| JP | 7-101509 | 4/1995 |
| JP | 10-134458 | 5/1998 |
| JP | 2002-316705 | 10/2002 |
| JP | 2003-246422 | 9/2003 |
| JP | 2003246422 A * | 9/2003 |
| JP | 2004-277167 | 10/2004 |
| JP | 2004277167 A * | 10/2004 |
| JP | 2006-290510 | 10/2006 |

OTHER PUBLICATIONS

International Search Report for PCT/JP2008/063057, mailed Oct. 14, 2008.
International Search Report for PCT/JP2007/070201, mailed Jan. 22, 2008.

(Continued)

*Primary Examiner* — Gene Crawford
*Assistant Examiner* — Yolanda Jones
(74) *Attorney, Agent, or Firm* — Fujitsu Patent Center

(57) ABSTRACT

An alignment adjusting apparatus of a robot to execute conveying operations of putting and taking an object to be conveyed in and out of an accommodating shelf includes at least two reference flags to be installed in the accommodating shelf; a flag measuring unit to measure the reference flags on the robot positioned at the reference flags; and an alignment adjusting unit to adjust an alignment shift of the robot corresponding to an inclination of the robot, the inclination being obtained from a variation of a measured value of each of the reference flags by the flag measuring unit.

25 Claims, 30 Drawing Sheets

OTHER PUBLICATIONS

English Translations of the International Preliminary Report on Patentability mailed May 20, 2010 in corresponding International Patent Application PCT/JP2007/070201.

English Translations of the International Preliminary Report on Patentability mailed May 20, 2010 in corresponding International Patent Application PCT/JP2008/063057.

* cited by examiner

FIG.8

| ACCOMMODATING SHELF | REFERENCE FLAG | | POSITION DATA |
|---|---|---|---|
| LEFT-SIDE ACCOMMODATING SHELF (10L) | ABOVE | A B C | D11 ⋮ |
| | UNDER | A B C | |
| BACK-SIDE ACCOMMODATING SHELF (10B) | | A B C | D21 ⋮ |
| RIGHT-SIDE ACCOMMODATING SHELF (10R) | ABOVE | A B C | D31 ⋮ |
| | UNDER | A B C | |

DATA STORING UNIT 90,94

US 8,214,076 B2

ALIGNMENT ADJUSTING APPARATUS, LIBRARY APPARATUS, AND ALIGNMENT ADJUSTING METHOD

CROSS-REFERENCE TO RELATED APPLICATIONS

This application is a continuation of International Application No. PCT/JP2008/63057, filed on Jul. 18, 2008, now pending, herein incorporated by reference, which is based upon and claims the benefit of priority from International Application No. PCT/JP2007/070201, filed on Oct. 16, 2007, herein incorporated by reference.

FIELD

The embodiments discussed herein are related to an alignment adjustment of a conveying robot that conveys an object to be conveyed such as a cartridge that accommodates a recording medium such as a magnetic recording tape, and related to, for example, an alignment adjusting apparatus, a library apparatus and an alignment adjusting method that automatically adjust an alignment error caused by variation due to aging, etc.

BACKGROUND

Conventionally, in a library apparatus, an alignment adjustment is executed between a robot and an accommodating shelf that accommodates a cartridge to improve the precision of putting and taking the cartridge in/out of the accommodating shelf.

Concerning the positions of the above accommodating shelf and the robot relative to each other, Japanese Laid-Open Patent Publication No. 04-020404 discloses that: a two-dimensional relative position table is provided; positioning using a design value as a target position is executed for an accommodating shelf that is not registered in the two-dimensional relative position table; a relative position of the accommodating shelf is measured using a relative position detecting sensor; positioning is executed to the center of the accommodating shelf; the result of the relative position measurement is registered into the relative position table; and, thereby, a table is automatically created and updated (page 3, lines 2 to 11 in the lower column on the left, FIGS. 2 and 3, etc.).

Japanese Laid-Open Patent Publication No. 10-134458 discloses that: a first to a third reference flags provided to measure the degree of an inclination of an accessor, and a plurality of relative position flags attached to a cell drum are included; a flag sensor attached to an accessor hand mechanism detects the first to the third reference flags; and an inclination of each of a Y axis and a Z axis of the accessor is obtained (Abstract, FIG. 1, etc.).

Japanese Laid-Open Patent Publication No. 07-101509 discloses that: the position of a frame of an accommodating shelf 1 is accurately detected; a position correction is executed for a target position; the result thereof (position correction information) is stored in an accommodating shelf position information storing apparatus 13; and, thereby, time for positioning operation on and after the second time is reduced (Abstract, FIG. 4, ETC.).

An alignment adjustment of a library apparatus is at most executed in an on-site adjustment of the library apparatus. However, with the increase of the density of mounting cartridges in an accommodating shelf, a conveying operation of cartridges is influenced by variation of an installation environment and variation due to aging of a robot and, thereby, the conveying operation generates an error therein. Therefore, putting and taking a cartridge in/out of the accommodating shelf may not be accurately executed.

When such an unpredictable situation occurs, the system has to be stopped and alignments for all the cells need to be again taken similarly to the on-site adjustment and this work is very troublesome.

Japanese Laid-Open Patent Publications Nos. 04-020404, 10-134458 and 07-101509 include no suggestion and no disclosure for such a problem and also include no disclosure concerning means of solving the problem.

SUMMARY

According to an aspect of the embodiments of the present invention, an alignment adjusting apparatus of a robot to execute conveying operations of putting and taking an object to be conveyed in and out of an accommodating shelf includes at least two reference flags to be installed in the accommodating shelf; a flag measuring unit to measure the reference flags on the robot positioned at the reference flags; and an alignment adjusting unit to adjust an alignment shift of the robot corresponding to an inclination of the robot, the inclination being obtained from a variation of a measured value of each of the reference flags by the flag measuring unit.

According to another aspect of the embodiments of the present invention, an alignment adjusting apparatus includes at least two robots to execute conveying operations of putting and taking an object to be conveyed in and out of an accommodating shelf; a reference flag to be installed in the accommodating shelf; a cell flag to be installed in a cell of the accommodating shelf; and a flag measuring unit to, when abnormality of cell access occurs to one of the robots, switch the robot to another robot to cause said another robot to execute the cell access before measurement for the reference flag and, when abnormality of the cell access occurs to two of the robots, measure the cell flag to be handled before the measurement of the reference flag.

According to further another aspect of the embodiments of the present invention, a library apparatus to include a robot that conveys a cartridge includes an accommodating shelf to accommodate the cartridge; at least one reference flag to be installed in the accommodating shelf; a flag measuring unit to measure the reference flag on the robot positioned at the reference flag; and an alignment adjusting unit to adjust an alignment shift of the robot corresponding to an inclination of the robot, the inclination being obtained from a result of the measurement by the flag measuring unit.

According to further another aspect of the embodiments of the present invention, a library apparatus includes at least two robots to execute conveying operations of putting and taking an object to be conveyed in and out of an accommodating shelf; a reference flag to be installed in the accommodating shelf; a cell flag to be installed in a cell of the accommodating shelf; and a flag measuring unit to, when abnormality of cell access occurs to one of the robots, switch the robot to another robot to cause said another robot to execute the cell access before measurement of the reference flag and, when abnormality of the cell access occurs to two of the robots, measure the cell flag to be handled before the measurement of the reference flag.

According to further another aspect of the embodiments of the present invention, an alignment adjusting method of a robot to put and take an object to be conveyed in and out of an accommodating shelf includes measuring at least one reference flag on the robot positioned to the reference flag that is installed in the accommodating shelf; and adjusting an alignment shift of the robot corresponding to an inclination of the robot, the inclination being obtained from a measured value obtained at said measuring.

According to further another aspect of the embodiments of the present invention, an alignment adjusting method for an apparatus to include at least two robots that put and take an object to be conveyed in and out of an accommodating shelf includes switching, when abnormality of cell access occurs, a robot when the abnormality thereof occurs to another robot and causing said another robot to execute the access before measuring a reference flag and, when errors occur to a plurality of the robots, measuring a cell flag to be handled.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Other objects, features and advantages of the present invention will become more apparent when referring to the accompanying drawings and the embodiments herein.

BRIEF DESCRIPTION OF DRAWINGS

FIG. 8 is a diagram of position data of reference flags in the data storing unit;

DESCRIPTION OF EMBODIMENTS

Embodiments of the present invention relate to an alignment adjusting apparatus, a library apparatus or an alignment adjusting method of a robot that conveys an object to be conveyed such as a cartridge. A reference flag is measured triggered by establishment of a measurement condition of the reference flag installed in an accommodating shelf that accommodates objects to be conveyed, a variation of an alignment between the robot and the accommodating shelf is detected based on the measurement result, and the alignment is adjusted according to the variation. The alignment adjustment can be executed by the robot without influencing a host computer and handling by the robot can be stabilized. In the case where an alignment adjustment of a robot on standby is automatically executed during an operation of a robot for operation, a rapid handling process is enabled when the operation is switched from the operation of the robot for operation to that of the robot on standby.

According to the embodiments of the present invention, in the case where at least two robots are included therein that execute conveying operations to put or take objects to be conveyed in/out of an accommodating shelf, when abnormality of cell access occurs to one of the robots, the robot is switched to the other robot and the other robot is caused to execute the cell access before the measurement of the reference flag and, when abnormality of cell access occurs to both of the two robots, whether variation due to aging has occurred to the robots or the accommodating shelf can be identified by measuring a cell flag to be handled before the measurement of the reference flag and the alignment adjustment can be executed. Therefore, reliability and stability of handling can be facilitated.

First Embodiment

Figure 1:
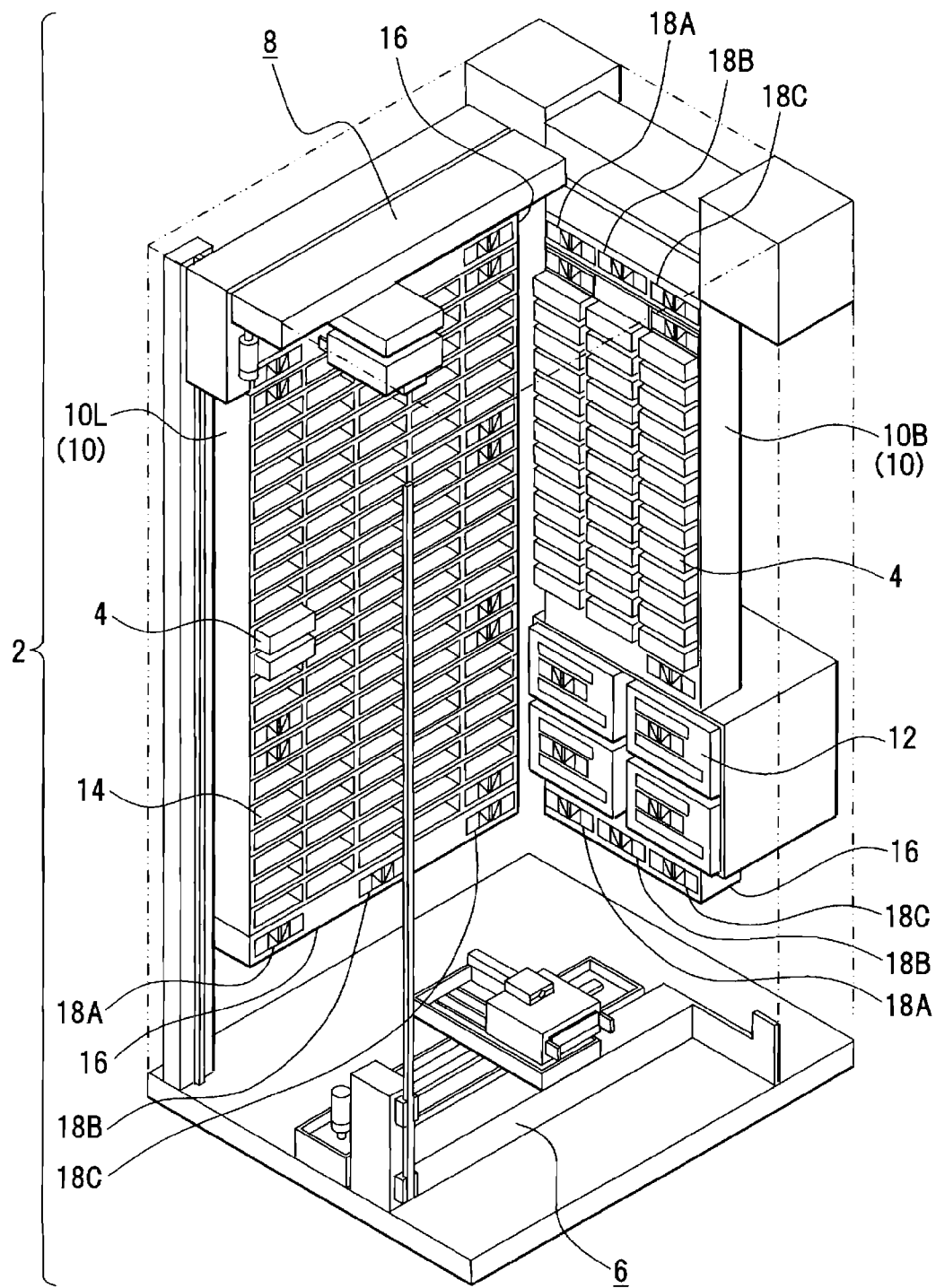
FIG. 1 is a diagram of a library apparatus according to a first embodiment.

A first embodiment of the present invention will be described with reference to FIG. 1. FIG. 1 is a diagram of an example of a library apparatus.

A library apparatus 2 is an embodiment of an alignment adjusting apparatus of conveying robots 6 and (hereinafter, simply "robots 6 and 8") that convey, for example, cartridges 4 as objects to be conveyed, and includes the robots 6 and 8, an accommodating shelf 10 that accommodates the cartridges 4 and a plurality of drive apparatuses 12. The cartridges 4 each accommodate therein a recording medium such as a magnetic recording tape, and are objects to be conveyed by the robot 6 or 8. The robots 6 and 8 are conveying unit that convey the cartridges 4 from the accommodating shelf 10 to the drive apparatuses 12 and convey the cartridges 4 from the drive apparatuses 12 to the accommodating shelf 10. One of the robots 6 and 8 is set to be a robot for operation and the other robot is used as a robot on standby that is used when abnormality occurs to the robot for operation. The accommodating shelf 10 is formed therein with cells 14 as accommodating space portions that accommodate the cartridges 4 and that are partitioned into a plurality of portions. Each of the drive apparatuses 12 is a data writing and reading unit and is a unit that writes data into a recording unit in the cartridge 4 and that reads data from the recording unit.

FIG. 1 depicts a left-side and a back-side accommodating shelves 10L and 10B as the accommodating shelf 10, and a practical apparatus includes a right-side accommodating shelf 10R (FIG. 6) on the opposite side of and facing the left-side accommodating shelf 10L. A plurality of reference flag displaying units 16 are set corresponding to a group of cells of cells 14 disposed in a matrix of the accommodating shelf 10. The back-side accommodating shelf 10B is installed with the plurality of drive apparatuses 12. The reference flag displaying unit 16 is also set beneath these driving apparatuses 12.

Each of the reference flag displaying units 16 is installed with reference flags 18A, 18B and 18C as at least one or a plurality of flag(s) indicative of reference positions to measure the inclination amounts of the robots 6 and 8. Each of the reference flags 18A to 18C is a flag that is indicative of the reference position of each of the robots 6 and 8 relative to the accommodating shelf 10 of the library apparatus 2. When the robot 6 or 8 measures these reference flags 18A to 18C, the inclination of the robot 6 or 8 (a variation) can be measured and, an alignment adjustment of the robots 6 and 8 relative to the cells 14 is executed according to the measured values. This alignment adjustment is correction of the relation of the relative positions between the robot 6 or 8 and each of the cells 14 of the accommodating shelf 10 and, in this correction, positions to put and take the cartridges 4 at/from are corrected.

Figure 4:
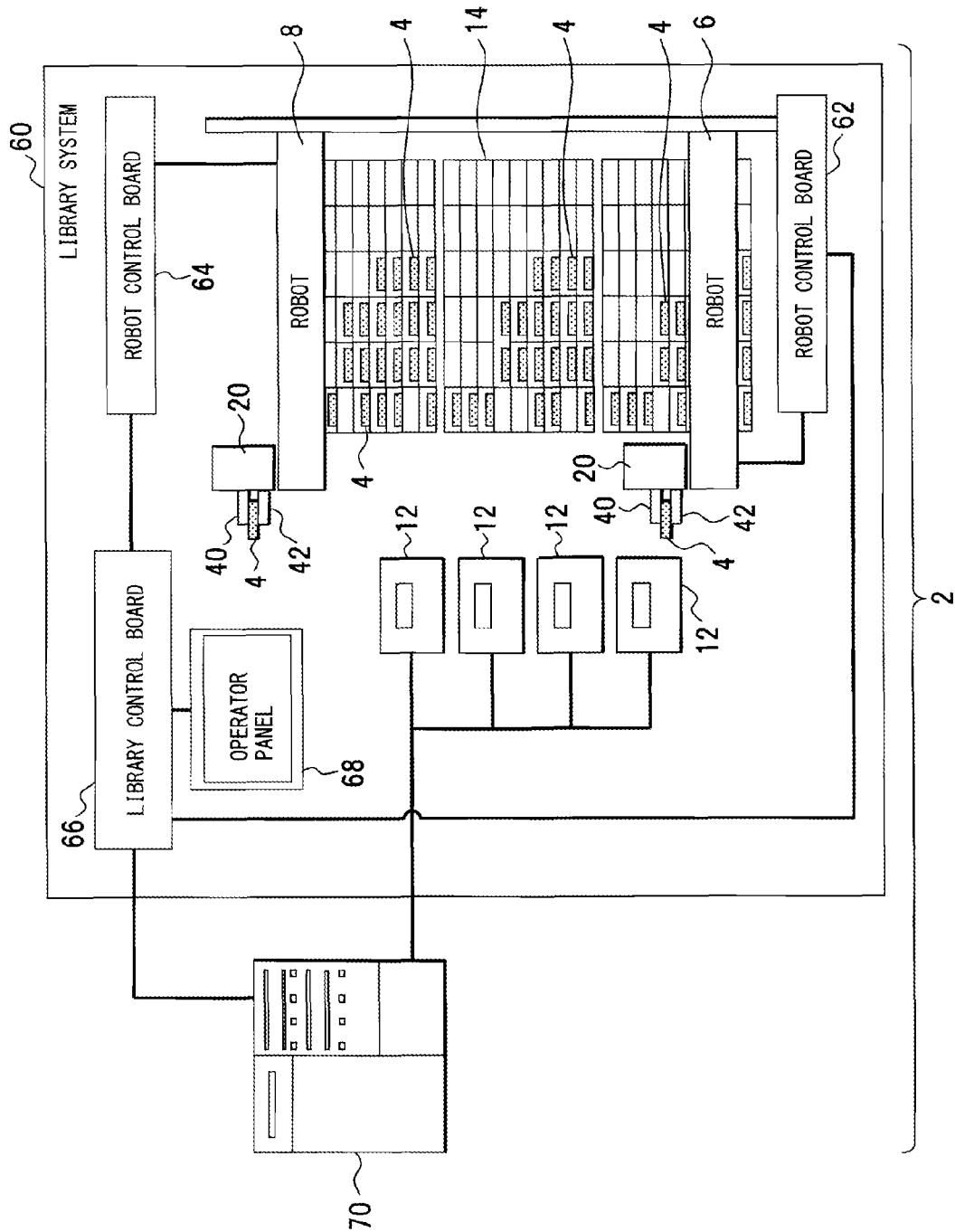
FIG. 4 is a diagram of an exemplary configuration of a library system.

According to the above library apparatus 2: the cartridge 4 is taken out of the cell 14 of the accommodating shelf 10 using the robot 6 or 8; the cartridge 4 is conveyed to and is attached to any one of the drive apparatuses 12; and writing or reading of data can be executed. The cartridge 4 for which writing or reading of the data is finished is taken out of the drive apparatus 12, is conveyed, and is accommodated in the cell 14 of the accommodating shelf 10. After such a process, the robot 6 or 8 stands by to receive an operation order from a host computer 70 (FIG. 4).

Figure 2:
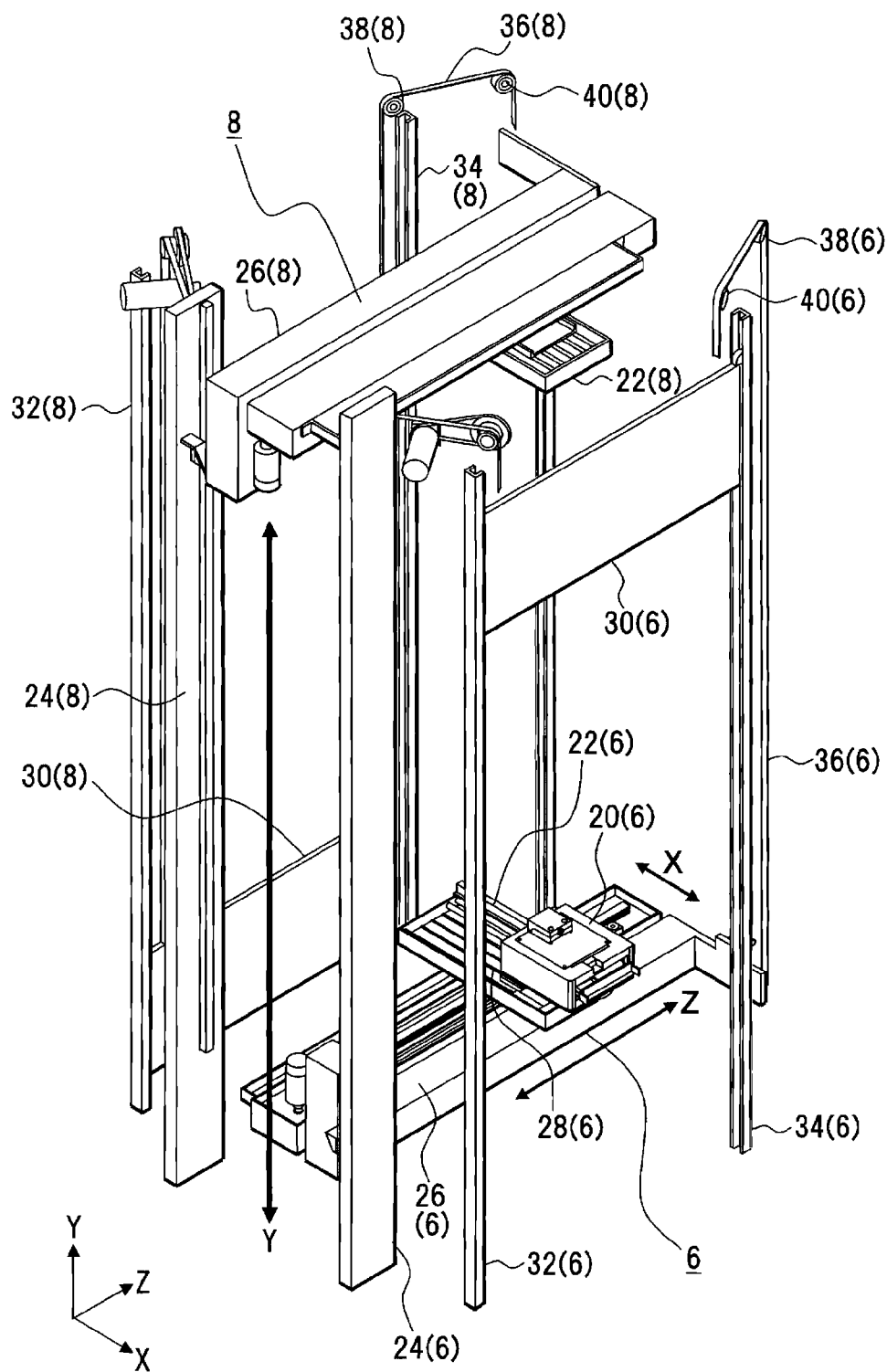
FIG. 2 is a diagram of an exemplary configuration of a robot.

The robots 6 and 8 will be described with reference to FIG. 2. FIG. 2 is a diagram of a conveying mechanism unit of the robot. In FIG. 2, the components same as those of FIG. 1 are given the same reference numerals.

The robot 6 includes as a robot mechanism unit a grasping mechanism unit 20, an X-axis conveying mechanism unit 22, a Y-axis conveying mechanism unit 24 and a Z-axis conveying mechanism unit 26. The grasping mechanism unit 20 is a unit of grasping the cartridge 4. The X-axis conveying mechanism unit 22 is a unit of conveying the grasping mechanism unit 20 along a guiding rail 28 in the X-axis direction.

The Y-axis conveying mechanism unit 24 is a unit of conveying the grasping mechanism unit 20 in the Y-axis direction with the Z-axis conveying mechanism unit 26 that is mounted with the grasping mechanism unit 20. A balancer 30 is installed to the Z-axis conveying mechanism unit 26 mounted with the grasping mechanism unit 20 and the X-axis conveying mechanism unit 22. A direction for the balancer 30 to ascend or descend is defined by guiding rails 32 and 34. The balancer 30 and the Z-axis conveying mechanism unit 26 are joined with each other though a timing belt 36. The timing belt 36 is suspended by pulleys 38 and 40. The Z-axis conveying mechanism unit 26 mounted with the grasping mechanism unit 20 and the X-axis conveying mechanism unit 22, and the balancer 30 are balanced through the timing belt 36.

Figure 3:
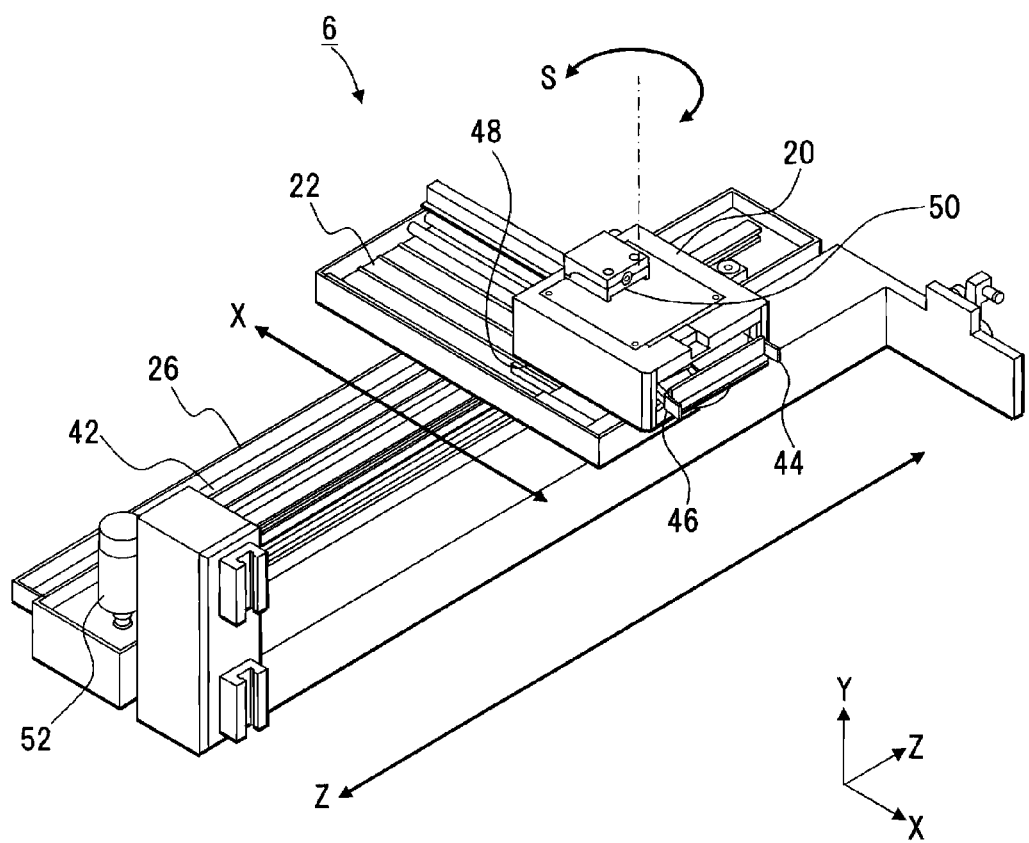
FIG. 3 is a diagram of an X-axis conveying mechanism unit, a Z-axis conveying mechanism unit and a grasping mechanism unit of the robot.

The Z-axis conveying mechanism unit 26 is a unit of conveying the X-axis conveying mechanism unit 22 mounted with the grasping mechanism unit 20 in the Z-axis direction along a guiding rail 42 (FIG. 3).

Similarly to the robot 6, the robot 8 includes the grasping mechanism unit 20, the X-axis conveying mechanism unit 22, the Y-axis conveying mechanism unit 24 and the Z-axis conveying mechanism unit 26, and these configurations are same as those of the robot 6, therefore, are given the same reference numerals, and will not again be described.

FIG. 3 is a diagram of the X-axis conveying mechanism unit, the Z-axis conveying mechanism unit and the grasping mechanism unit of the robot. In FIG. 3, the same components as those of FIGS. 1 and 2 are given the same reference numerals.

The grasping mechanism unit 20 includes picker arm units 44 and 46 as grasping unit of grasping the cartridges 4, and also includes a rotating mechanism unit 48 to rotate the grasping mechanism unit 20 in a direction indicated by an arrow "S". A flag sensor 50 as a flag measuring unit is installed on the top of the grasping mechanism unit 20. The flag sensor 50 is configured by, for example, a CCD (Charge Coupled Device) sensor and detects a flag as an image.

The X-axis conveying mechanism unit 22 mounted with the grasping mechanism unit 20 is mounted on the guiding rail 42 of the Z-axis conveying mechanism unit 26, and is moved by driving of a motor 52 in a direction corresponding to the direction of the rotation of the motor 52.

Figure 5:
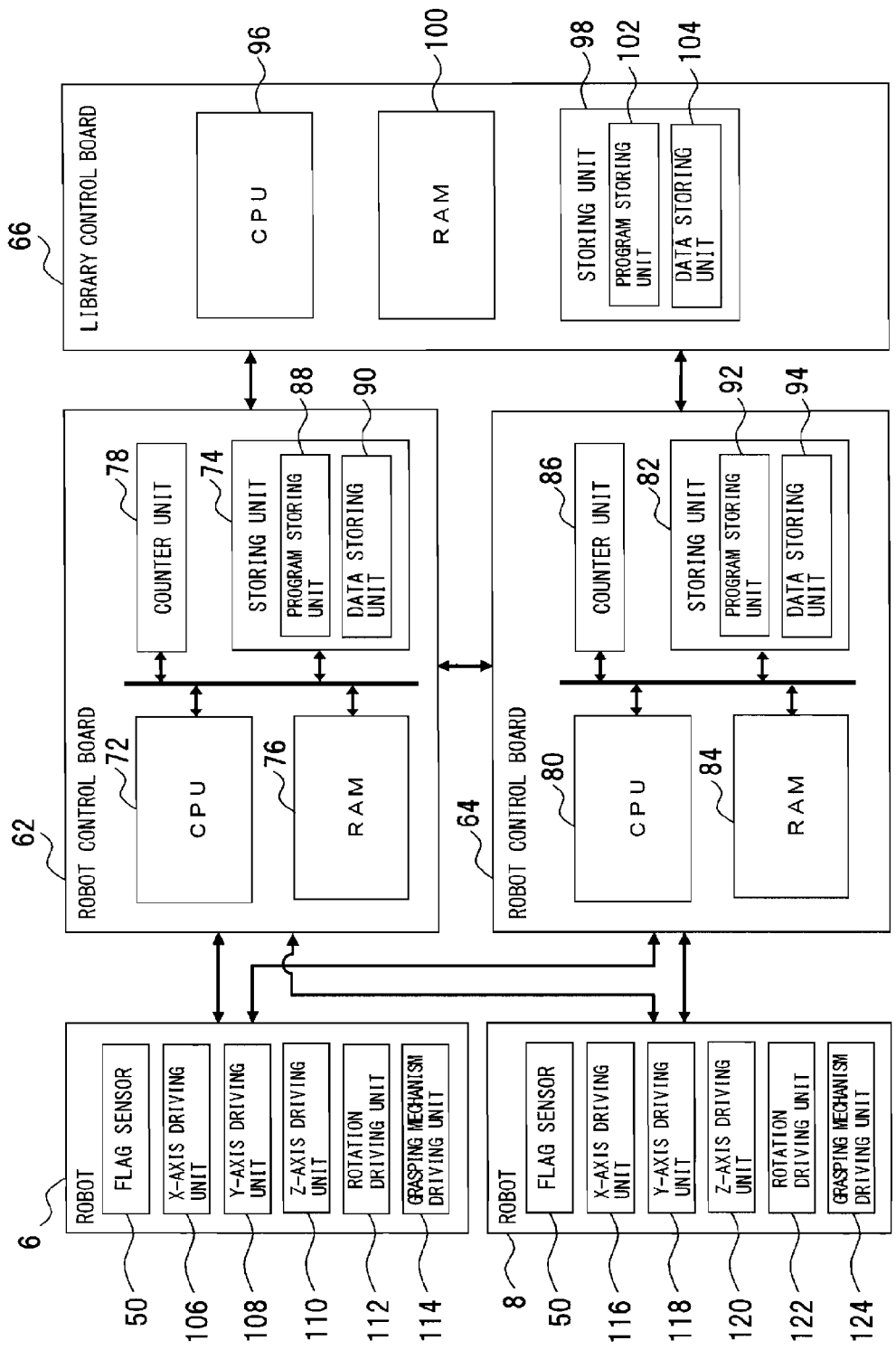
FIG. 5 is a diagram of an exemplary configuration of the robot, a robot control board and a library control board.

A control system of the library apparatus will be described with reference to FIGS. 4 and 5. FIG. 4 is a diagram of the control system. FIG. 5 is a diagram of an exemplary configuration of a control board. In FIGS. 4 and 5, the same components as those of FIGS. 1 to 3 are given the same reference numerals.

As depicted in FIG. 4, a library system 60 of the library apparatus 2 is installed with a robot control board 62 as a control unit and an alignment adjusting unit of the robot 6 and a robot control board 64 as a control unit and an alignment adjusting unit of the robot 8, and is installed with a library control board 66 as a control unit of the whole system. The library control board 66 is connected to an operator panel 68 and is connected to a host computer 70. The operator panel 68 is a unit of inputting and outputting information and can execute inputting and outputting of information by operation of an operator.

Each of the drive apparatuses 12 is connected to the host computer 70, and writing or reading of information into/from the recording medium of the cartridge 4 attached to the drive apparatus 12 is executed by the host computer 70.

As depicted in FIG. 5, the robot control board 62 is installed with a CPU (Central Processing Unit) 72, a storing unit 74, a RAM (Random-Access Memory) 76 and a counter unit 78. The robot control board 64 is installed with a CPU 80, a storing unit 82, a RAM 84, and a counter unit 86. The CPU 72 executes a control program using an OS (Operating System) stored in the storing unit 74 and executes conveyance control for the cartridge 4 and an alignment adjustment. Similarly, the CPU 80 executes a control program using an OS stored in the storing unit 82 and executes conveyance control for the cartridge 4 and an alignment adjustment.

The storing unit 74 is configured by, for example, a non-volatile memory. The storing unit 74 includes a program storing unit 88 and a data storing unit 90. The program storing unit 88 stores therein a robot control program, an alignment adjusting program, etc., in addition to the OS. The data storing unit 90 stores therein position data corresponding to the robot 6, etc. Similarly, the storing unit 82 is configured by, for example, a non-volatile memory. The storing unit 82 includes a program storing unit 92 and a data storing unit 94. The program storing unit 92 similarly stores therein a robot control program, an alignment adjusting program, etc., in addition to the OS. The data storing unit 94 also stores therein position data corresponding to the robot 8, etc. The position data stored in the data storing units 90 and 94 is data representative of positions of the cells 14 and data representative of positions of the reference flags and the cell flags.

Each of the counter units 78 and 86 is an example of a time counting unit, counts, for example, a clock signal as a count signal, and is used to measure a measurement time period for the reference flag, etc. A counter in the CPU 72 or 80 is used to select the left-side or the right-side accommodating shelf 10L or 10R when a patrolling operation is executed. However, the counter units 78 and 86 may also be used for the selection.

The library control board 66 is installed with a CPU 96, a storing unit 98, and a RAM 100. The CPU 96 executes a program stored in the storing unit 98 and executes control of reading or writing of information, etc., for the recording medium of the cartridge 4 designated by the host computer 70. The storing unit 98 is configured by, for example, a non-volatile memory and includes a program storing unit 102 and a data storing unit 104. The program storing unit 102 stores therein a program to execute control of communication with the host computer 70 and reading or writing from/into the cartridge 4, etc. The data storing unit 104 stores therein identification information to identify the cartridges 4 stored in the cells 14, etc.

The robot 6 is installed with an X-axis driving unit 106 of the X-axis conveying mechanism unit 22, a Y-axis driving unit 108 of the Y-axis conveying mechanism unit 24 and a Z-axis driving unit 110 of the Z-axis conveying mechanism unit 26, and includes the flag sensor 50, a rotation driving unit 112 corresponding to the rotating mechanism unit 48 and a grasping mechanism driving unit 114 that drives to open and close the picker arm units 44 and 46. Each of them is driven by a driving signal from the robot control board 62 and a sensor output of the flag sensor 50 is taken into the CPU 72 of the robot control board 62.

Similarly, the robot 8 is installed with an X-axis driving unit 116 of the X-axis conveying mechanism unit 22, a Y-axis driving unit 118 of the Y-axis conveying mechanism unit 24 and a Z-axis driving unit 120 of the Z-axis conveying mechanism unit 26, and includes the flag sensor 50, a rotation driving unit 122 corresponding to the rotating mechanism unit 48 and a grasping mechanism driving unit 124 that drives to open and close the picker arm units 44 and 46. Each of them is driven by a driving signal from the robot control board 64 and a sensor output of the flag sensor 50 is taken into the CPU 80 of the robot control board 64.

Figure 6:
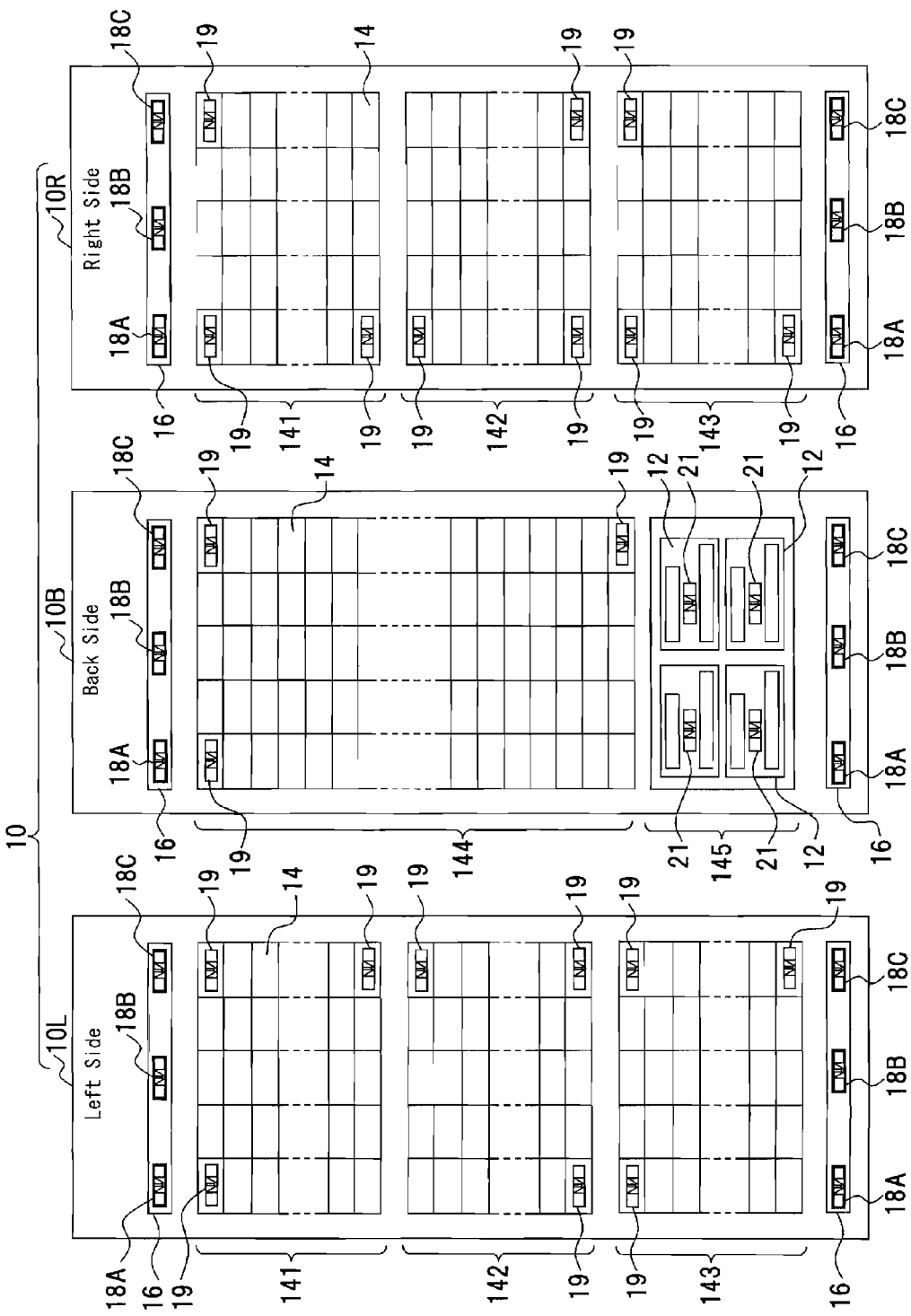
FIG. 6 is a diagram of an exemplary configuration of an accommodating shelf and reference flags.

Flag disposition of the accommodating shelf 10 will be described with reference to FIG. 6. FIG. 6 is a diagram of the accommodating shelf disposed therein with flags. In FIG. 6, the same components as those of FIG. 1 are given the same reference numerals.

The left-side accommodating shelf 10L is installed therein with the plurality of cells 14 in a matrix that are divided into a plurality of cell groups such as, for example, three sets of cell groups 141, 142 and 143. The reference flag displaying unit 16 is installed above the cell group 141 and the reference flag displaying unit 16 is also installed under the cell group 143.

A cell flag 19 is installed at each of the head and the tail of a first row and the tail of the last row of the cell group 141. The cell flag 19 is installed at each of the tail of a first row and the head and the tail of the last row of the cell group 142. The cell flag 19 is installed in the cell group 143 at each of the same positions as those of the cell group 141. The cell flags 19 are the flags that use the reference flags 18A to 18C as references and that each represent a reference position for each of the cell groups 141, 142 and 143, and each of the cells 14 relative to the accommodation shelf 10.

Each of the reference flag displaying units 16 is set to have the same width as that of each of the cell groups 141 to 143. Each of the reference flag displaying units 16 is installed with, for example, the three reference flags 18A to 18C at the positions in the right, left and the center thereof.

The back-side accommodating shelf 10B is installed with a set of cell group 144 as the plurality of cells 14 in a matrix. A drive group 145 is installed beneath the cell group 144. The reference flag displaying unit 16 is installed above the cell group 144 and under the drive group 145.

The cell flag 19 is installed at each of the head and the tail of a first row and the tail of the last row of the cell group 144. The drive group 145 is installed therein with drive flags 21 in each drive apparatus 12. The reference flag displaying units 16 of the back-side accommodating shelf 10B are also set to have the same width as that of the cell group 144 and are also each installed with the reference flags 18A to 18C.

The right-side accommodating shelf 10R is installed therein with the plurality of cells 14 in a matrix that are divided into a plurality of cell groups such as, for example, three sets of cell groups 141, 142 and 143. The reference flag displaying unit 16 is installed above the cell group 141 and the reference flag displaying unit 16 is also installed under the cell group 143.

The cell flag 19 is installed in the cell groups 141 to 143 of the right-side accommodating shelf 10R at each of the positions corresponding to and facing that of the left-side accommodation shelf 10L. The positions of the cell flags 19 of the right-side and the left-side accommodating shelves 10R and 10L are in a relation of symmetry. The reference flag displaying unit 16 of the right-side accommodating shelf 10R is installed therein with the reference flags 18A to 18C similarly to the left-side accommodating shelf 10L.

Figure 7:
FIG. 7 is a diagram of position data of cells in a data storing unit.

Position information of the cells and the reference flags of the accommodating shelf will be described with reference to FIGS. 7 and 8. As depicted in FIG. 7, the data storing units 90 and 94 store therein position data of the cells 14 of the accommodating shelf 10 and, as depicted in FIG. 8, store therein position data of the reference flags 18A to 18C installed in the accommodating shelf 10. These pieces of data are corrected and updated by the alignment adjustment.

Figure 9:
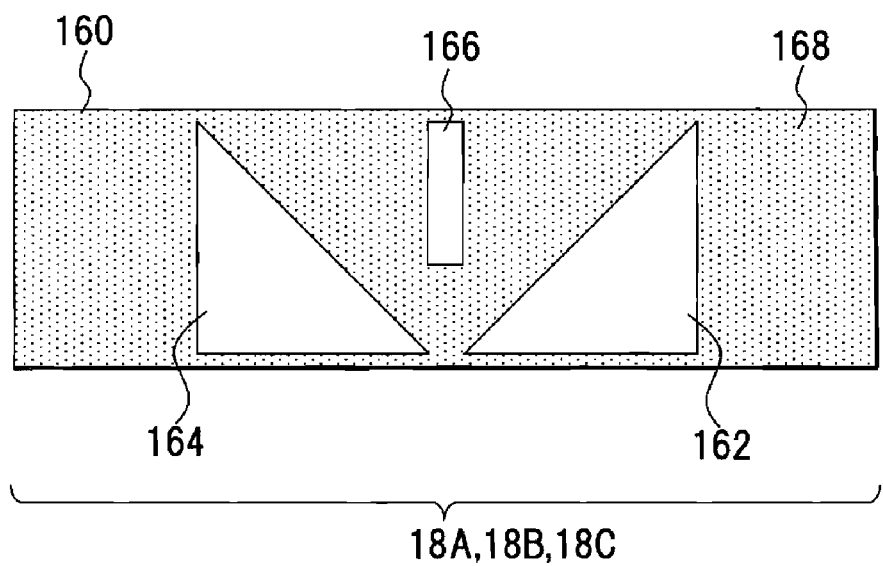
FIG. 9 is a diagram of an example of a reference flag.

A flag will be described with reference to FIG. 9. FIG. 9 is a diagram of the reference flag. In FIG. 9, the same components as those of FIGS. 1 and 6 are given the same reference numerals.

Each of the reference flags 18A to 18C includes, for example, a first, a second and a third white portions 162, 164 and 166 as a first area, and a black portion 168 as a second area on a base portion 160 thereof made of a rectangular board-like member. The white portions 162, 164 and 166 are applied with a paint having a high optical reflectance such as a white paint or a silver paint. The black portion 168 is applied with a paint having a low optical reflectance such as a black paint. The white portions 162, 164 and 166 and the black portion 168 configure an area that has borders across which the lightness conspicuously differs.

The white portion 166 has a rectangular shape and is formed in the central position of the base portion 160. The white portions 162 and 164 each have a right-angled isosceles triangular shape, are formed in the right and left centering the central axis of the white portion 166, and face each other sandwiching the white portion 166 using a hypotenuse of each of the white portions 162 and 164. That is, when a Y-axis for an X-Y coordinate is set at the center of the white portion 166, the white portions 162, 164 and 166 are symmetrical centering the Y-axis.

A shift measurement apparatus is configured by such reference flag 18A, 18B or 18C and the flag sensor 50 that is the flag measuring unit, and the shift measuring apparatus executes shift measurement.

Figure 10:
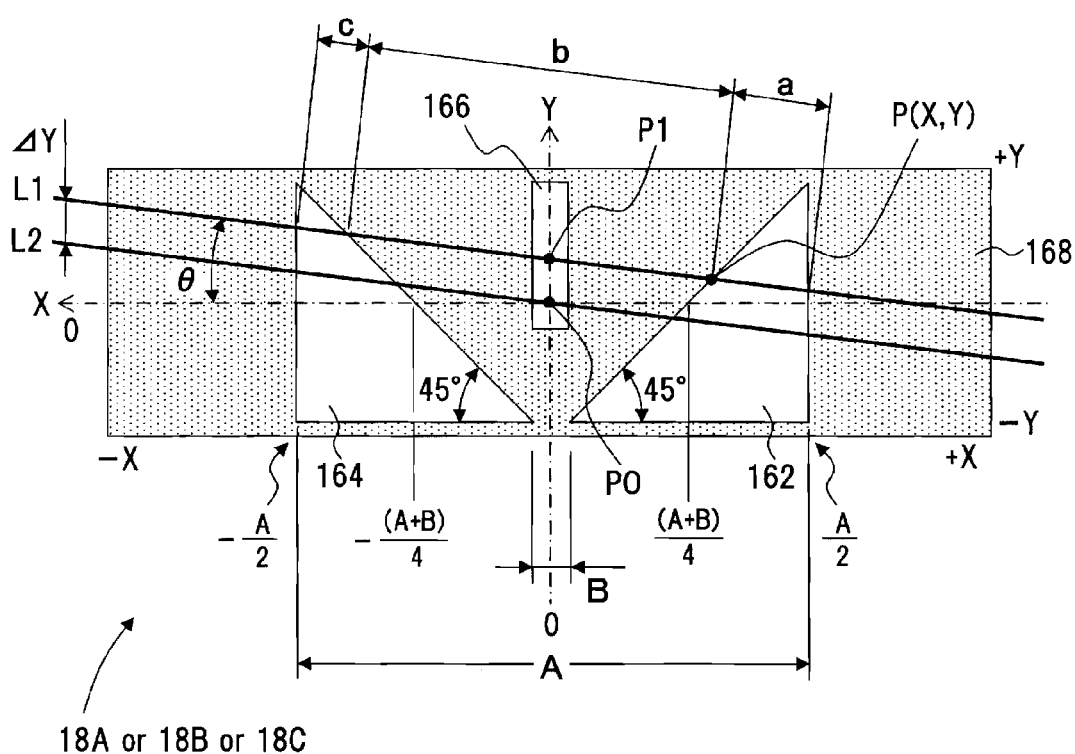
FIG. 10 is a diagram of detection of an inclination of the robot by reference flag measurement.
Figure 11:
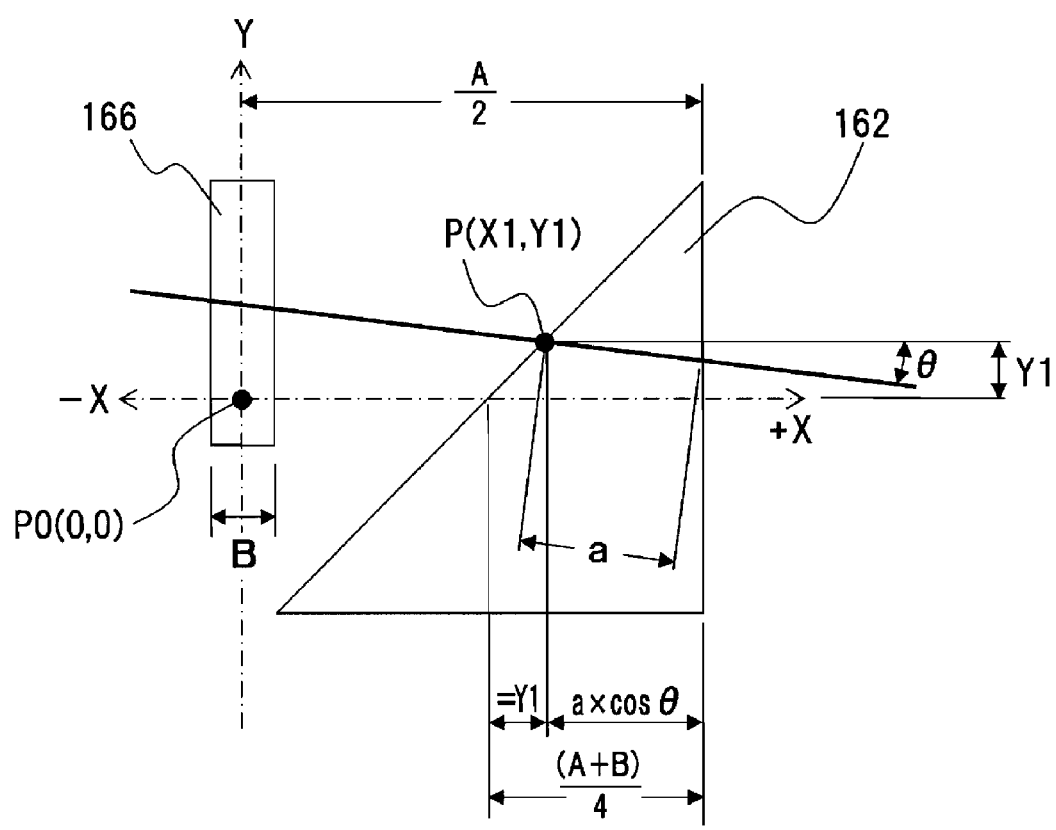
FIG. 11 is an enlarged diagram of the inclination of the robot depicted in FIG. 10.

Measurement of the reference flag will be described with reference to FIGS. 10 and 11. FIG. 10 is a diagram of detection of an inclination of the robot by reference flag measurement. FIG. 11 is a partially enlarged diagram of FIG. 10. In FIGS. 10 and 11, the same components as those in FIGS. 1 and 9 are given the same reference numerals.

"L1" denotes a detection line used when the flag sensor 50 is configured by, for example, a CCD sensor. In this example, the detection line L1 includes a rotational component due to the inclination of the robot 6. An angle "θ" is a rotation angle of the detection line L1 against the X axis. In FIG. 10, the detection line L1 passes through a center O of the reference flag 18A, 18B or 18C (hereinafter, simply "flag 18") and "L2" denotes a target detection line that has an intersection P1 with the center O.

When the detection line L1 in X-Y coordinates formed on the flag 18 is obtained, the detection line L1 is a straight line and, therefore, can be expressed in Equation (1).

$$Y = -X^* \tan\theta + \Delta Y \quad (1)$$

In the above, "ΔY" is a Y coordinate at an intersection of the detection line L1 and the Y axis. The target detection line L2 passes through a flag center PO and, therefore, can be expressed in Equation (2).

$$Y = -X^* \tan\theta \quad (2)$$

The coordinates (X1, X2) of a point P at which the detection line L1 and a side of the white portion 166 cross each other correspond to the white portions 162 and 164 and the black portion 168 for each dot of an image that is a detection unit of the flag sensor 50, and become an ON or an OFF output. Distances a, b and c are obtained using the number of dots of a bordering point between the white portion 162 and the black portion 168 and a bordering point between the white portion 164 and the black portion 168.

In this example, the distances a and c are c≠a because the detection line L1 includes the rotational component. When the distances a and c are a>c, the detection line L1 has a slope that descends as it extends rightward. When the distances a and c are a<c, the detection line L1 has a slope that ascends as it extends rightward. In this example, the distances a and c are a>c.

The vicinity of the point P is enlarged and is depicted in FIG. 11. Denoting a distance between vertical portions of the white portions 162 and 164 as "A" (FIG. 10), the X coordinate X1 of the point P is obtained from Equation (3).

$$X1 = A/2 - a^*\cos\theta \quad (3)$$

Denoting the width of the white portion 166 as "B" (FIGS. 10 and 11), the Y coordinate Y1 of the point P is obtained from Equation (4).

$$Y1 = (A-B)/4 - a^*\cos\theta \quad (4)$$

Here, cos θ is cos θ=A/(a+b+c).

A position shift amount ΔY in the Y-axis direction relative to the flag center PO of the detection line L1 is obtained from Equation (5) based on Equation (3).

$$\Delta Y = Y + X^*\tan\theta \quad (5)$$

When Equations (3) and (4) are substituted in Equation (5), the position shift amount ΔY is obtained from Equation (6).

$$\Delta Y = (A-B)/4 - a^*\cos\theta + (\lambda/2 - a^*\cos\theta)^*\tan\theta \quad (6)$$

Though the case where the distances a and c are a>c is described in the embodiment, the detection line L1 has the slope that descends as it extends rightward. When the distances a and c are a<c, the position shift amount ΔY is also obtained by exchanging the values of a and c between each other in Equation (6).

Figure 12:
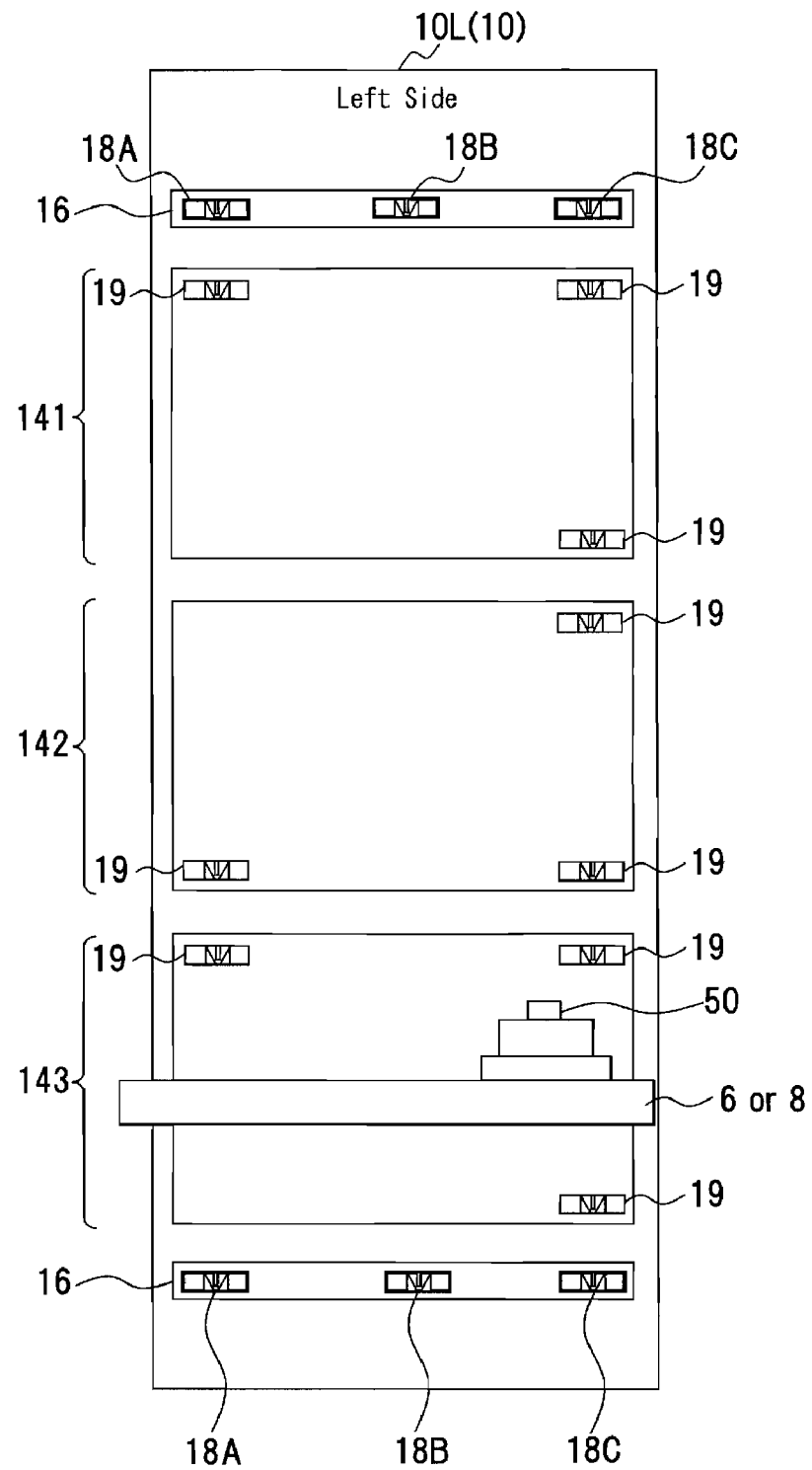
FIG. 12 is a diagram of the case where no inclination occurs to the robot.
Figure 13:
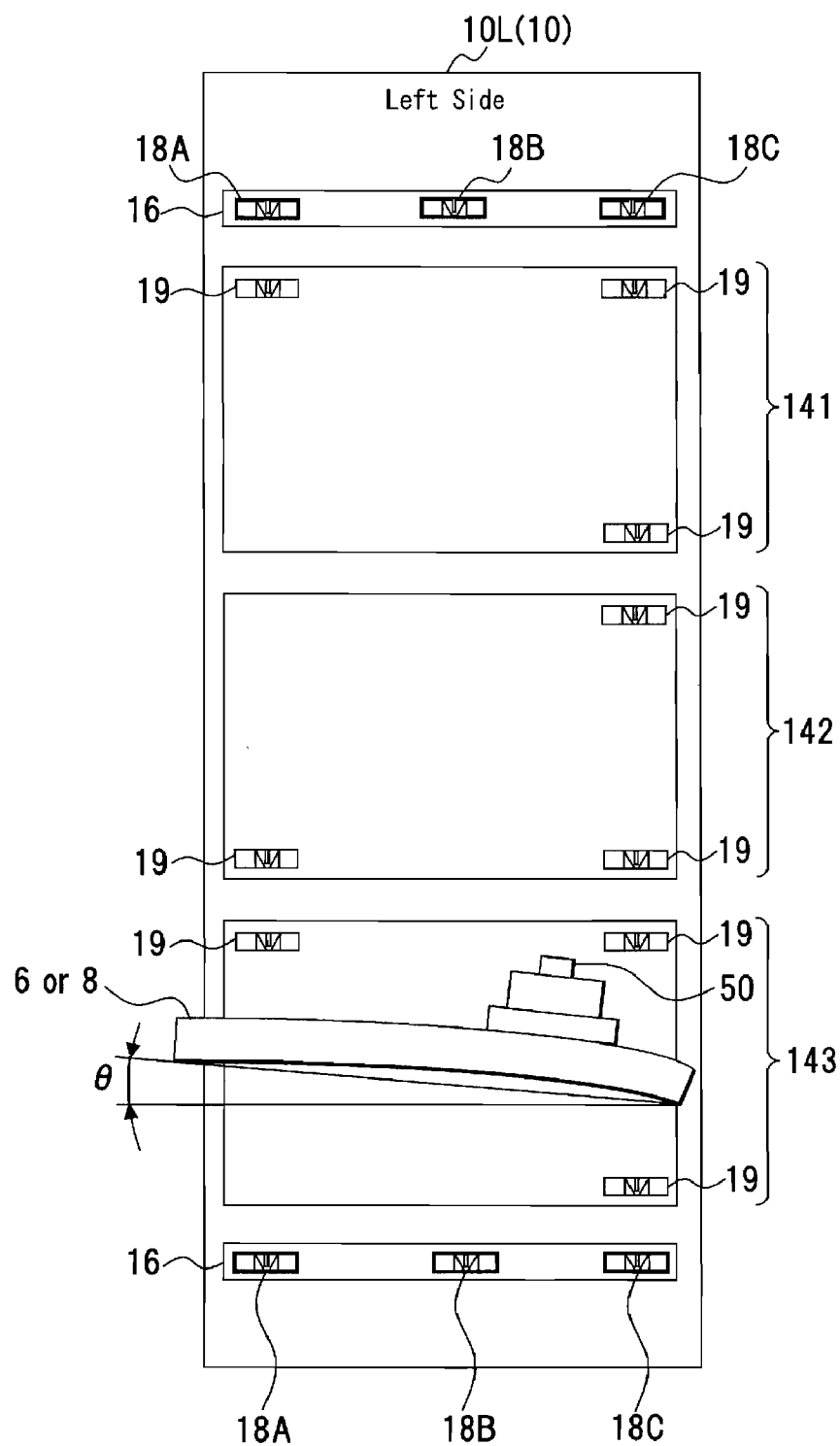
FIG. 13 is a diagram of the case where an inclination occurs to the robot.

An inclination of the robot and its alignment adjustment will be described with reference to FIGS. 12 and 13. FIG. 12 is a diagram of the case where no inclination occurs to the robot. FIG. 13 is a diagram of the case where an inclination occurs to the robot. In FIGS. 12 and 13, the same components as those of FIGS. 1, 3 and 6 are given the same reference numerals.

FIG. 12 depicts the relation between the left-side accommodating shelf 10L and the robot 6. When no inclination occurs to the robot 6, the robot 6 is maintained being parallel to the cell groups 141 to 143 of the left-side accommodating shelf 10L. In contrast, when an inclination of an angle θ occurs to the robot 6, as depicted in FIG. 13, putting in and taking out of the cartridge 4 becomes difficult because a shift is generated between the cell positions of the cell groups 141 to 143 of the left-side accommodating shelf 10L and the conveyance position (the position to putting in or taking out) of the cartridge 4 by the robot 6. In this case, an alignment adjustment is necessary for the robot 6. Such an alignment adjustment is same for the robot 8.

Figure 14:
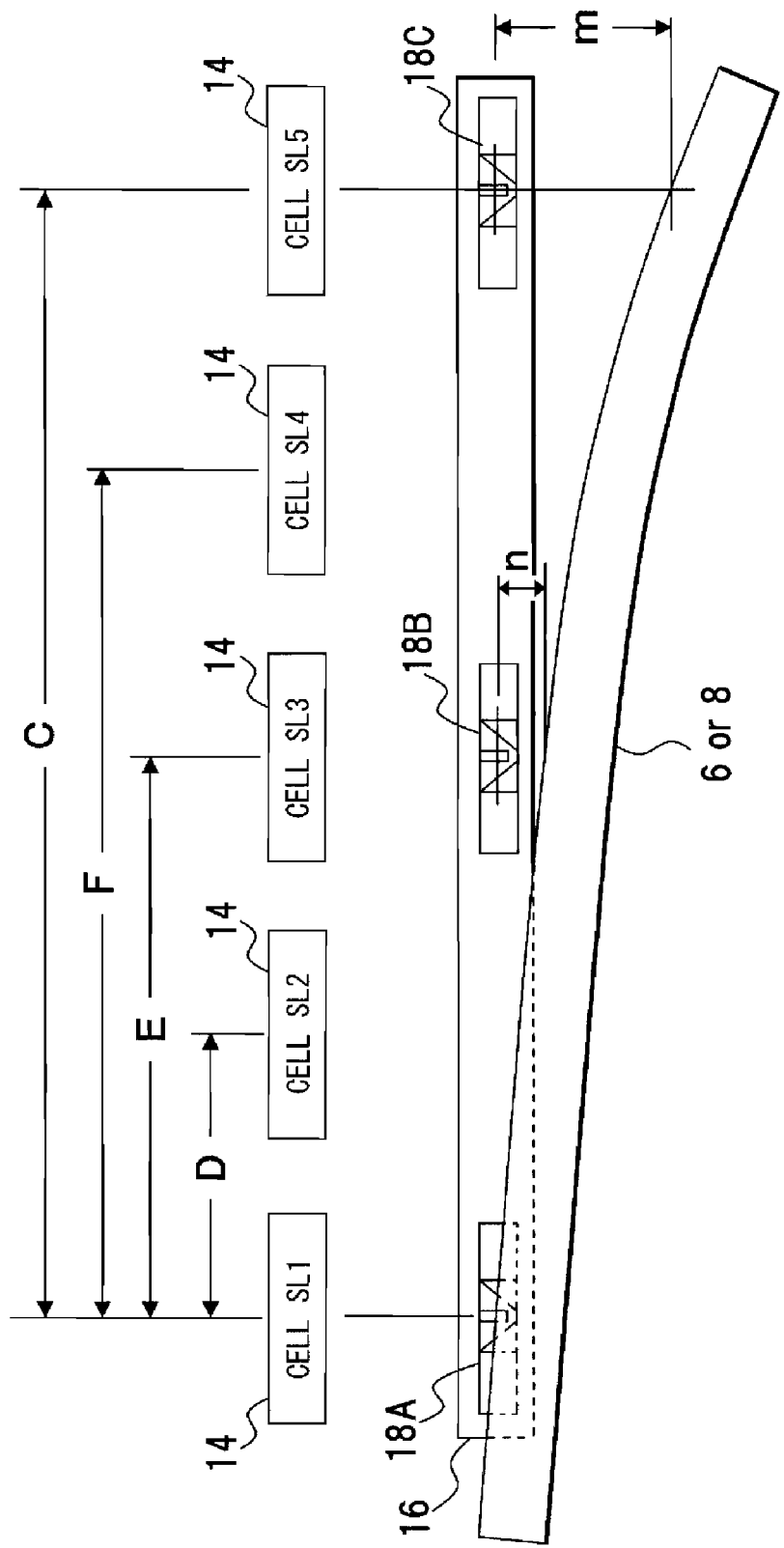
FIG. 14 is a diagram of a relation among the inclination of the robot, the cells, and the reference flags.
Figure 15:
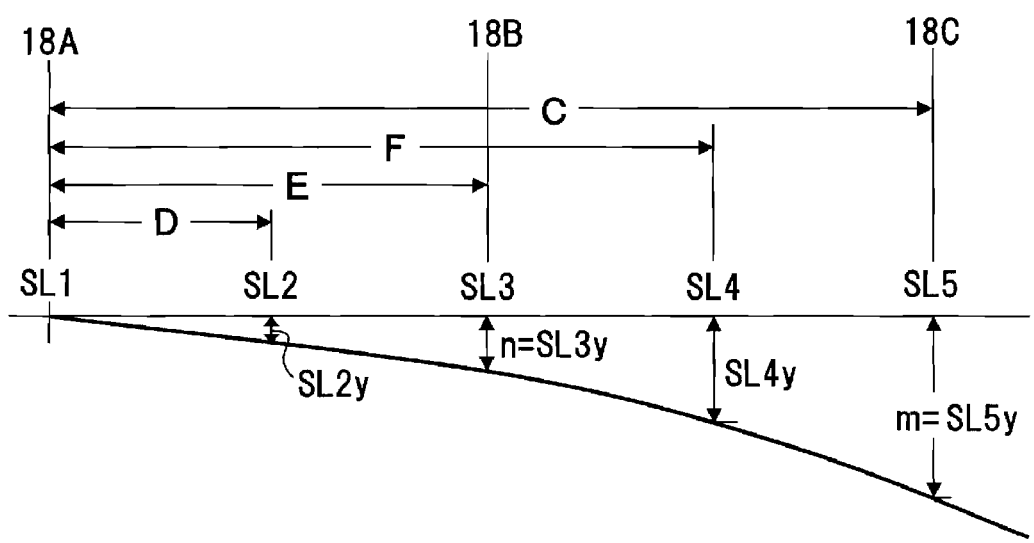
FIG. 15 is a diagram for explaining a computing process of the inclination using flag measurement.

An alignment adjustment executed when an inclination occurs to the robot 6 or 8 as above will be described with reference to FIGS. 14 and 15. FIG. 14 is a diagram of a relation between the inclination of the robot, and the cells and reference flags. FIG. 15 is a diagram of simplified version of FIG. 14. In FIGS. 14 and 15, the same components as those of FIGS. 1 and 6 are given the same reference numerals.

In an example depicted in FIG. 14, in the accommodating shelf 10, the reference flags 18A to 18C are installed in the reference flag displaying unit 16 for each of cells SL1, SL2, SL3, SL4 and SL5 laterally arranged as the plurality of cells 14.

In this case, in the case where the inclination occurs to the robot 6 or 8: when the reference flag 18A is measured positioning the flag sensor 50 of the robot 6 or 8 at the reference flag 18A, no problematic shift is present; when the reference flag 18B is measured positioning the flag sensor 50 at the reference flag 18B, a shift measured is denoted by "n"; and when the reference flag 18C is measured positioning the flag sensor 50 at the reference flag 18C, a shift measured is denoted by "m".

For the shifts n and m, when the inclination and no curving occur to the robot 6 or 8, the shift is corrected using the following Equations (7), (8), (9) and (10) that are correction equations. In this case, denoting the distance between the reference flags 18A and 18C as "C", the distance between the cells SL1 and SL2 as "D", the distance between the cells SL1 and SL3 as "E", the distance between the cells SL1 and SL4 as "F", the distance between the cells SL1 and SL5 as "C", and inclination adjustment amounts concerning the cells SL2, SL3, SL4 and SL5 as "SL2y", "SL3y", "SL4y" and "SL5y", SL2y, SL3y, SL4y and SL5y are as follows.

$$SL2y=(D/C)\times m \quad (7)$$

$$SL3y=(E/C)\times m \quad (8)$$

$$SL4y=(F/C)\times m \quad (9)$$

$$SL5y=m \quad (10)$$

As depicted in FIG. 15, when curving occurs to the robot 6 or 8, shift correction is executed using the following Equations (11), (12), (13) and (14) that are correction equations. The inclination adjustment amounts SL2y, SL3y, SL4y and SL5y in this case are as follows.

$$SL2y=(D/E)\times n \quad (11)$$

$$SL3y=n \quad (12)$$

$$SL4y=n+(F-E)/(C-E)\times(m-n) \quad (13)$$

$$SL5y=m \quad (14)$$

Figure 16:
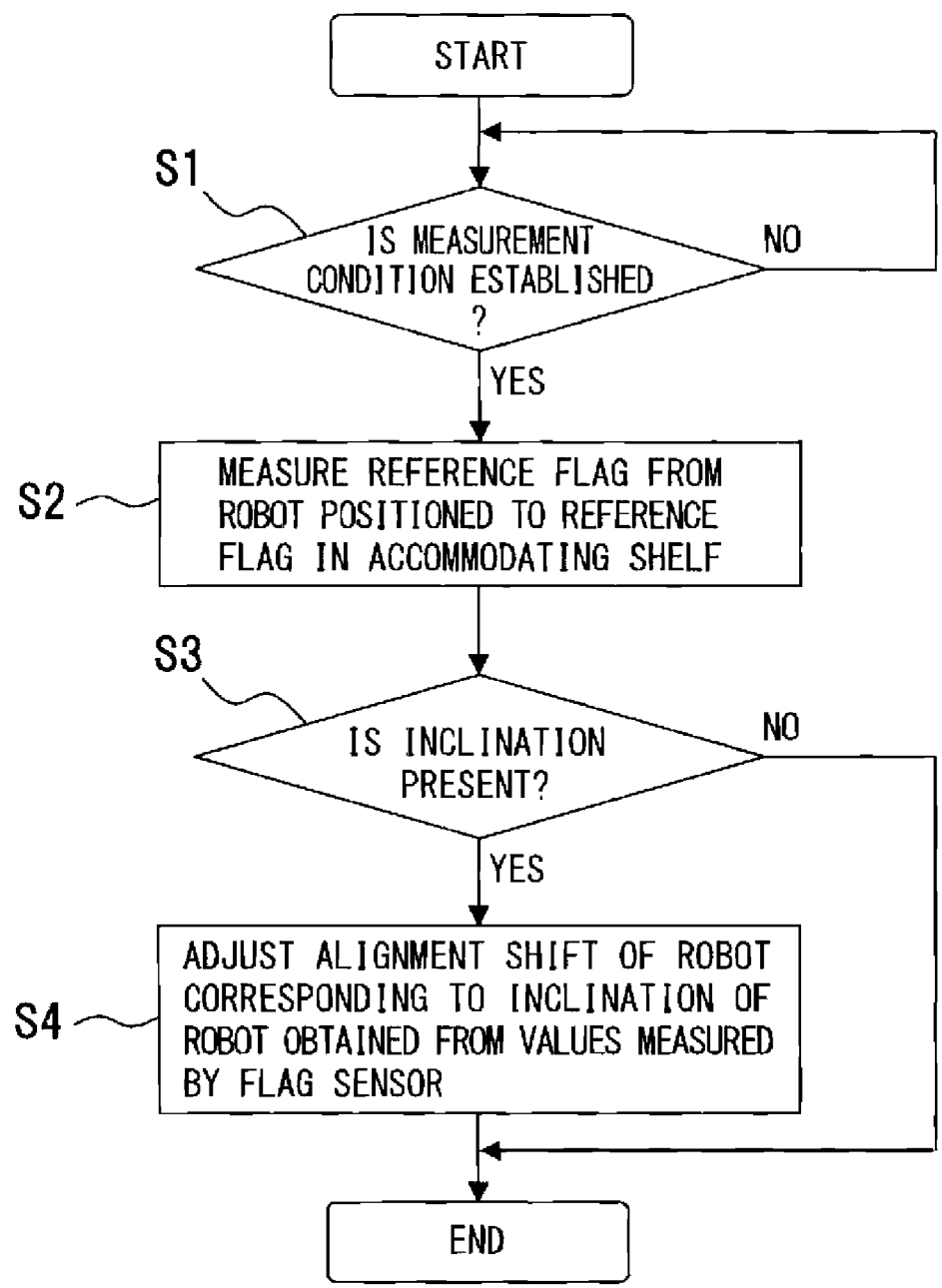
FIG. 16 is a flowchart of a process procedure of an alignment adjusting method.

Process steps of an alignment adjusting method will be described with reference to FIG. 16. FIG. 16 is a flowchart of an example of the alignment adjusting method.

The alignment adjusting method includes a) a measurement condition monitoring step (S1), b) a flag measurement step (S2), c) an inclination determining step (S3) and d) an alignment adjusting step (S4). The alignment adjusting method is realized by a computer process in the above library system 60. However, the alignment adjusting method may also be adapted to be executed by a manual process.

a) Measurement Condition Monitoring Step (S1)

At a measurement condition monitoring step, whether the measurement condition is established is monitored, and a lapse of a specific time period from the time of the previous flag measurement, occurrence of a handling error of the robot, etc., may be set to be the measurement condition. Otherwise, being within a predetermined time period from the time of turning on the power may be determined as the establishment of the measurement condition.

b) Flag Measurement Step (S2)

At the flag measurement step, any one or all of the reference flags 18A to 18C is (are) measured as above by the flag sensor 50 using an image by positioning the robot 6 or 8 to any one or all of the reference flags 18A to 18C.

c) Inclination Determining Step (S3)

At the inclination determining step, the inclination of the robot 6 or 8 is obtained from the measurement data of the reference flags 18A to 18C and whether the robot 6 or 8 has an inclination or an inclination to be alignment-adjusted is determined. When any inclination to be alignment-adjusted is present, the procedure moves to the alignment adjusting step (step S4) and, when no such inclination is present (NO of step S3), the process steps come to an end without executing any alignment adjustment.

d) Alignment Adjusting Step (S4)

For the robot 6 or 8, an alignment shift of the robot 6 or 8 is adjusted corresponding to the inclination of the robot 6 or 8 obtained from the values measured by the flag sensor 50. This adjustment is executed by correcting the position data (FIGS. 7 and 8).

According to the above alignment adjusting method, the library apparatus 2 corrects the position data corresponding to the inclination of the robot 6 or 8 and, therefore, the position shift of the robot 6 or 8 caused by its variation due to aging, an earthquake, maintenance, etc., can be automatically corrected and, therefore, stabilization of handling of the cells 14 of the accommodating shelf 10 by the robot 6 or 8, that is, putting in and taking out of cartridges 4 can be facilitated. Therefore, a highly reliable library apparatus can be provided and the reliability of its processing can be improved.

Figure 17:
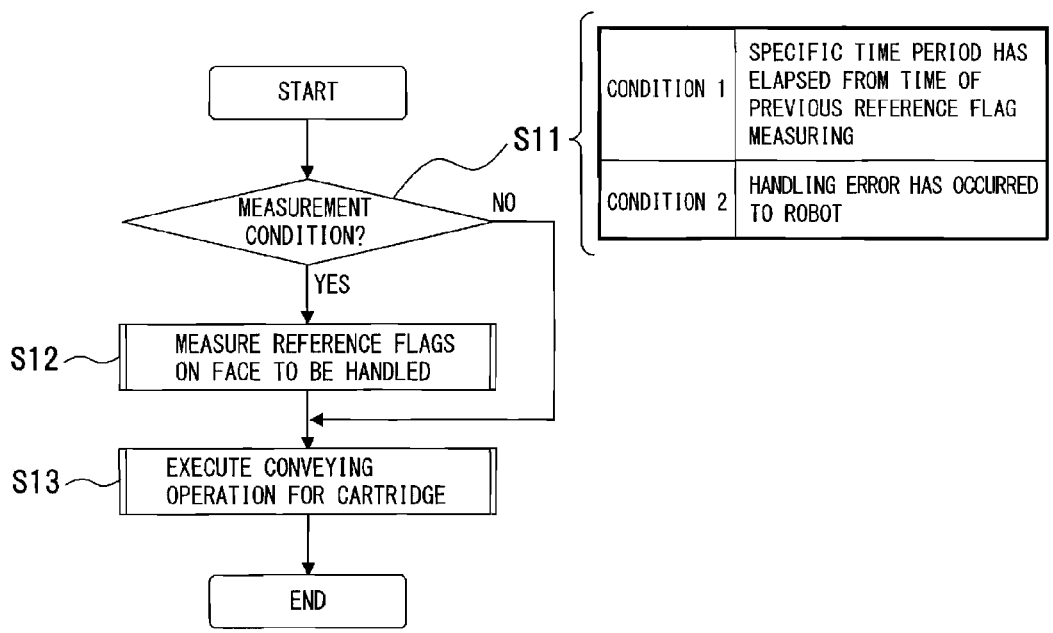
FIG. 17 is a flowchart of a process procedure of a reference flag measuring process.

A reference flag measurement operation will be described with reference to FIG. 17. FIG. 17 is a flowchart of a process procedure of the reference flag measurement operation.

The reference flag measurement is executed by a computer process of the library system 60. Such process is executed moving the robot 6 or 8 and a plurality of conditions can each be set to be the measurement condition. For example, whether a specific time period has elapsed since the time of the previous reference flag measuring process can be set to be a condition 1, and whether a handling error has occurred to the robot in operation that is set to the robot for operation out of the robots 6 and 8 can be set to be a condition 2. That is, the condition 1 employs the lapse of time as its element even when the handling error, etc., has not occurred. By setting the condition 1, the alignment adjustment is regularly executed and, therefore, any shift caused by variation due to aging can be absorbed. Therefore, when a robot that has long been set to be the robot on standby is set to be the robot for operation, no alignment adjustment needs to be executed for the robot after the robot is set to be the robot for operation and this robot can quickly take over the process. According to the setting of the condition 1, the alignment adjustment of the robot on standby is automatically executed during the operation of the robot for operation. The condition 2 employs occurrence of an error as its element even if a specific time period has not elapsed. By setting the condition 2, any unpredictable situation such as an earthquake can be coped with.

In the process procedure, an operation of the robot 6 or 8 is started and whether the situation matches the measurement condition is determined (step S11). The measurement condition is the above condition 1 or 2. When the situation matches the measurement condition (YES of step S11), the reference flags on the face to be handled are measured (step S12), a conveying operation for the cartridge 4 is executed (step S13), and the move of the robot 6 or 8 is ended.

When the situation does not match the measurement condition in step S11 (NO of step S11), a conveying operation for the cartridge 4 is executed without executing the reference flag measurement of the face to be handled in step S12 (step S13), and the move of the robot 6 or 8 is ended.

Figure 18:
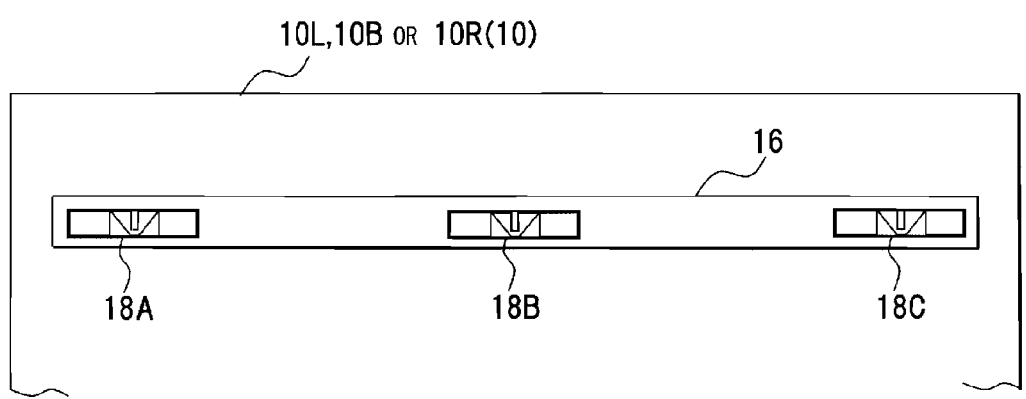
FIG. 18 is a diagram of a disposition of the reference flags.
Figure 19:
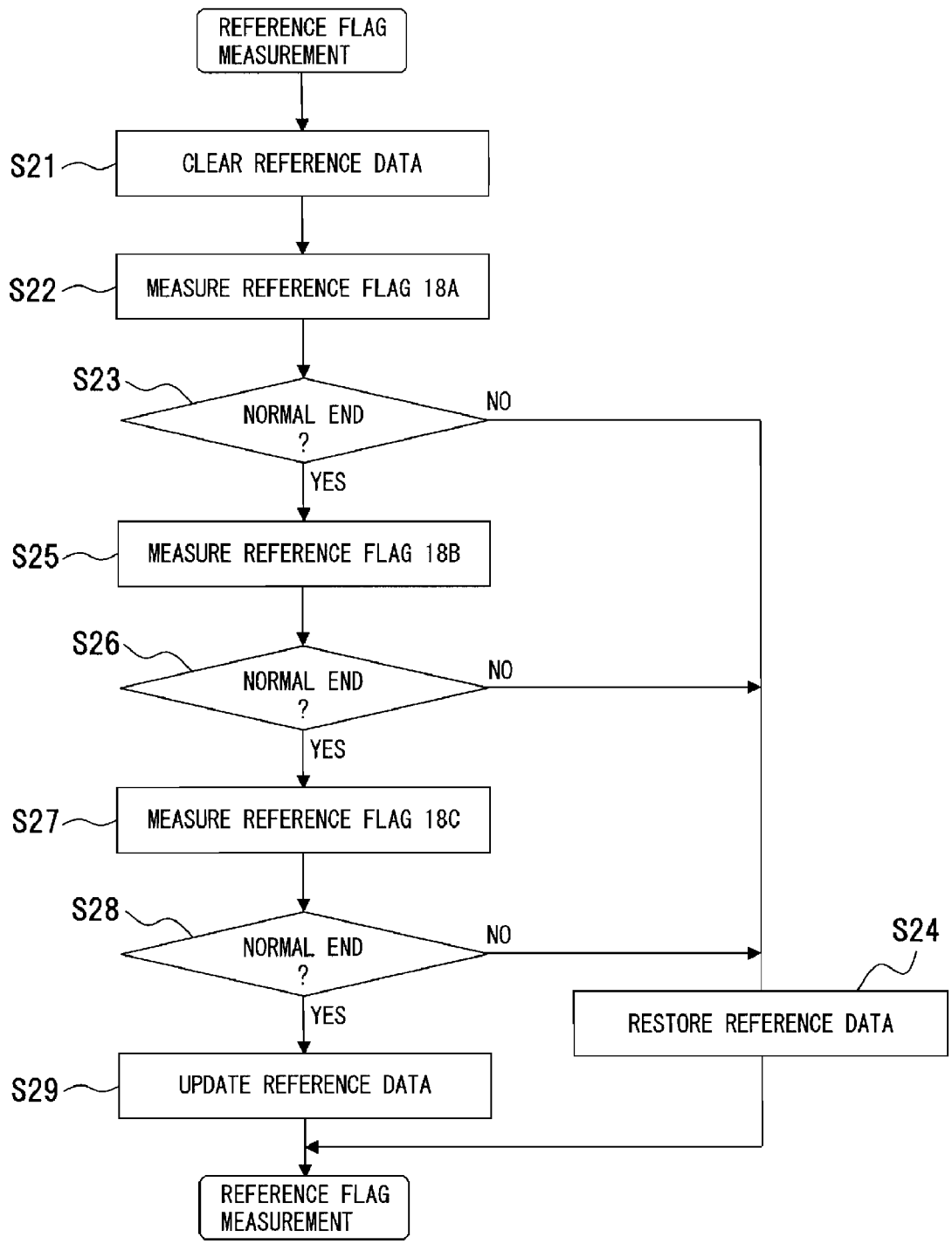
FIG. 19 is a flowchart of a process procedure of a reference flag measuring process.

A reference flag measuring process will be described with reference to FIGS. 18 and 19. FIG. 18 is a diagram of a disposition of the reference flags. FIG. 19 is a flowchart of a process procedure of the reference flag measuring process. In FIG. 18, the same components as those of FIGS. 1 and 6 are given the same reference numerals.

The reference flag measuring process is executed positioning the robot 6 or 8 at the reference flags 18A to 18C in the left-side, the back-side, and the right-side accommodating shelves 10L, 10B and 10R of the accommodating shelf 10.

The process procedure to execute the measurement of the reference flags 18A to 18C is a subroutine of a main routine (FIG. 17) and is a specific process step of step S12, and the measurement of the reference flags 18A to 18C is executed in the process procedure.

In the process procedure, when the procedure moves to the reference flag measurement, reference data (FIGS. 7 and 8)

stored in the data storing unit 90 or 94 that stores therein the reference data is cleared (step S21) and, thereby, previous reference data is erased. After clearing the reference data, the reference flag 18A is measured (step S22) and whether the procedure is normally ended is determined based on the result of the measurement of the reference flag 18A (step S23). When the procedure is not normally ended (NO of step S23), restoring of the reference data is executed (step S24) and the reference flag measurement is continued.

When the measurement of the reference flag 18A is normally ended (YES of step S23), the reference flag 18B is measured (step S25) and whether the procedure is normally ended is determined based on the result of the measurement of the reference flag 18B (step S26). When the procedure is not normally ended (NO of step S26), restoring is executed as storing or updating of the reference data (step S24) and the reference flag measurement is continued.

When the measurement of the reference flag 18B is normally ended (YES of step S26), the reference flag 18C is measured (step S27) and whether the procedure is normally ended is determined based on the result of the measurement of the reference flag 18C (step S28). When the procedure is not normally ended (NO of step S28), restoring of the reference data is executed (step S24). When the procedure is normally ended (YES of step S28), the reference data of each of the reference flags 18A to 18C is updated (step S29) and the measurement of the reference flags is ended.

Figure 20:
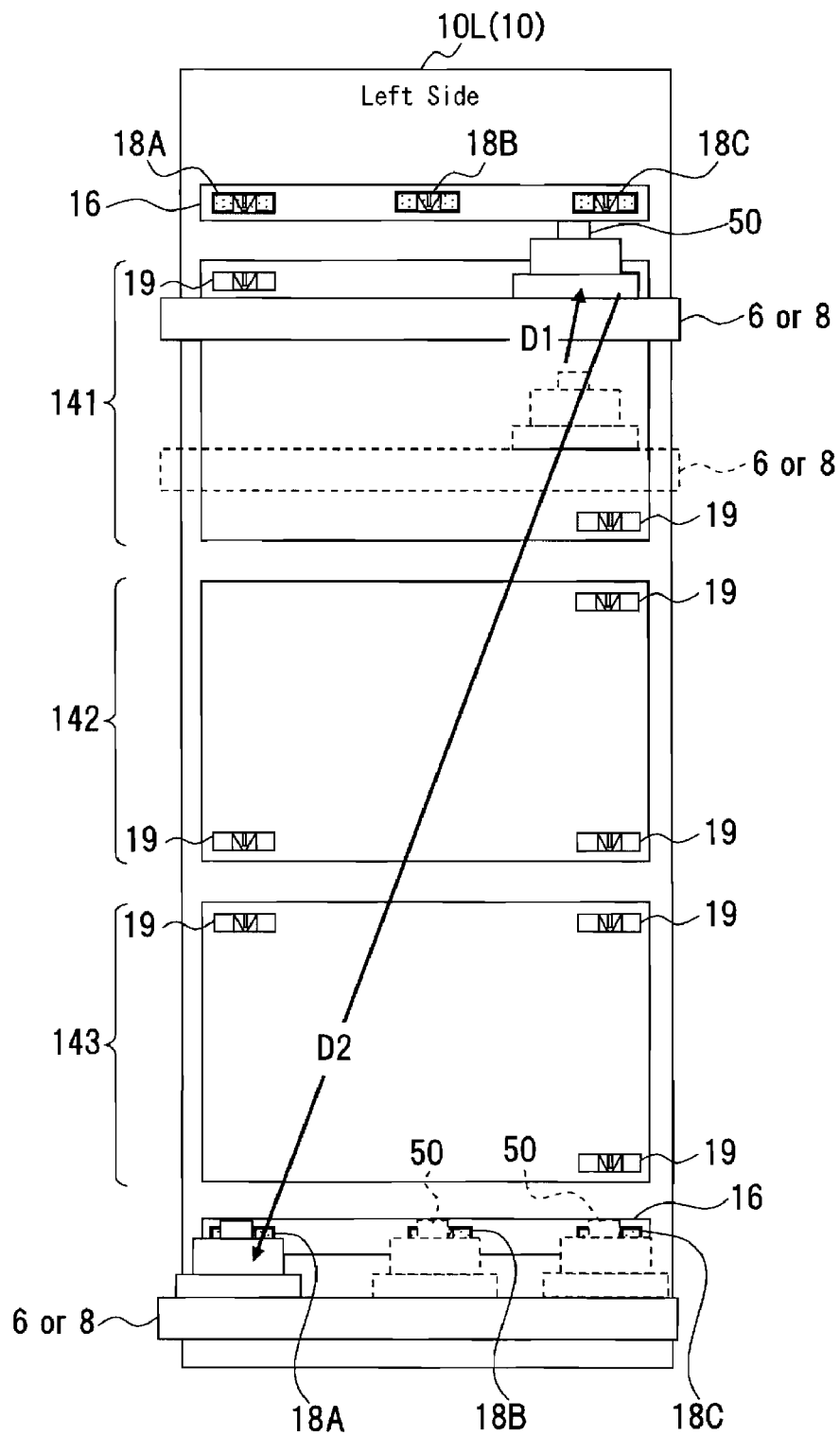
FIG. 20 is a diagram of a move of the robot for cell flag measurement.
Figure 21:
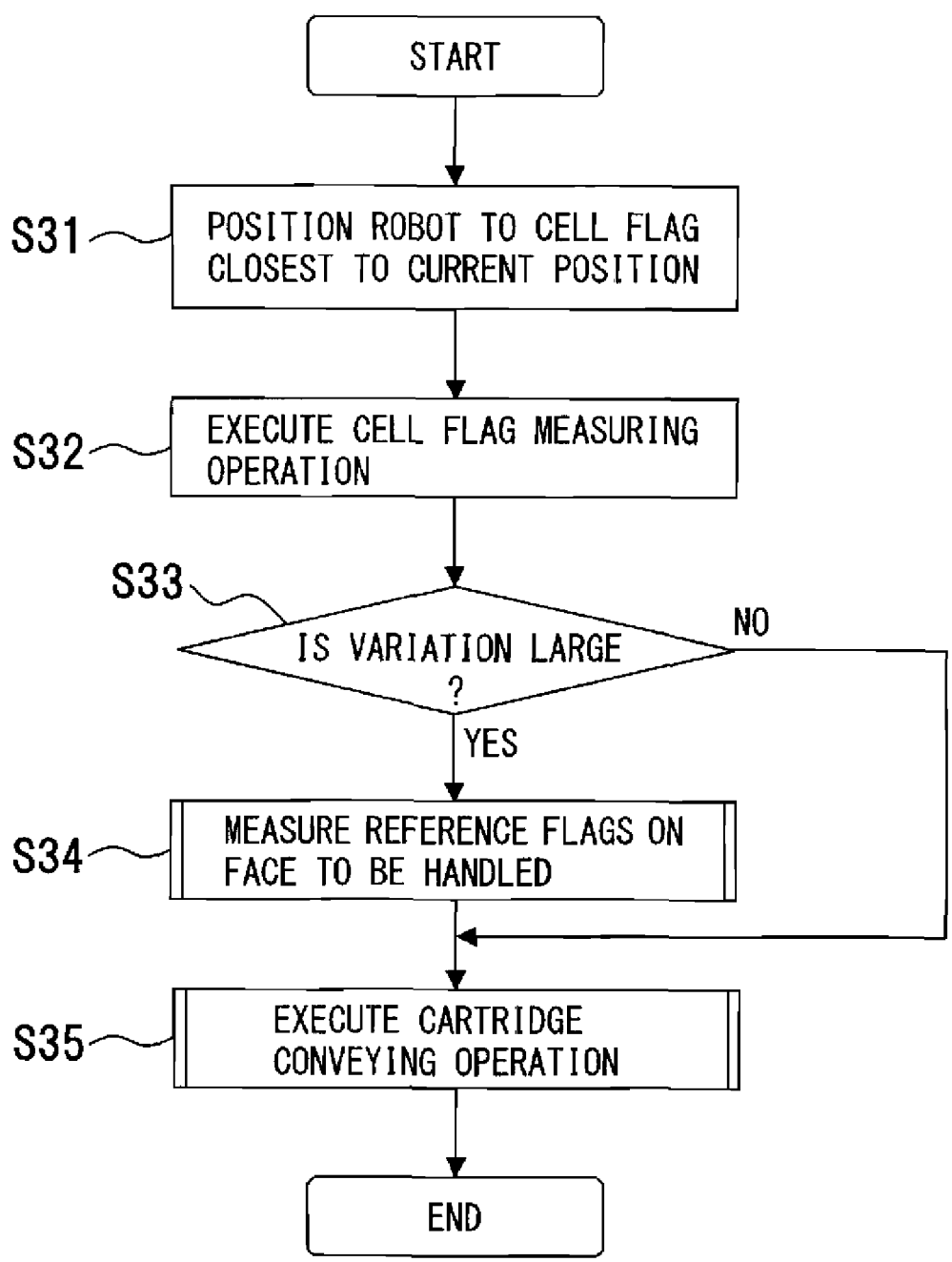
FIG. 21 is a flowchart of a process procedure of the cell flag measurement.

Measurement of cell flags will be described with reference to FIGS. 20 and 21. FIG. 20 is a diagram of an example of the cell flag measurement. FIG. 21 is a flowchart of a process procedure of the cell flag measurement. In FIG. 20, the same components as those in FIGS. 1 and 6 are given the same reference numerals.

When a shift of the cell flag 19 is large, the measurement of the reference flags on the face to be handled is necessary. As depicted in FIG. 20, the robot 6 or 8 is each positioned to the cell flag 19 at a position closest to a current position D1, executes the flag measurement at its position, moves to the face to be handled when the variation is large, and measures the reference flag 18A at its position D2. By using the cell flag 19 that is the closest position, the adjustment can be completed before detecting a timeout, etc., even when an error is detected during execution of a process from the host computer 70.

As depicted in FIG. 21, in the process procedure, the robot 6 or 8 is positioned to the cell flag 19 at the position closest to the current position D1 at which robot 6 or 8 is present (step S31), and the robot 6 or 8 executes a cell flag measuring operation at this position (step S32).

As the result of the measurement of the cell flag 19, whether the variation is large is determined (step S33). When the variation is large (YES of step S33), the robot 6 or 8 is moved to the face to be handled and the reference flags on the face to be handled are measured (step S34). A cartridge conveying operation is executed (step S35) and the move of the robot 6 or 8 is ended.

At step S33, when the variation is not large (NO of step S33), the cartridge conveying operation is executed without executing the process of step S34 (step S35) and the move of the robot 6 or 8 is ended.

Figure 22:
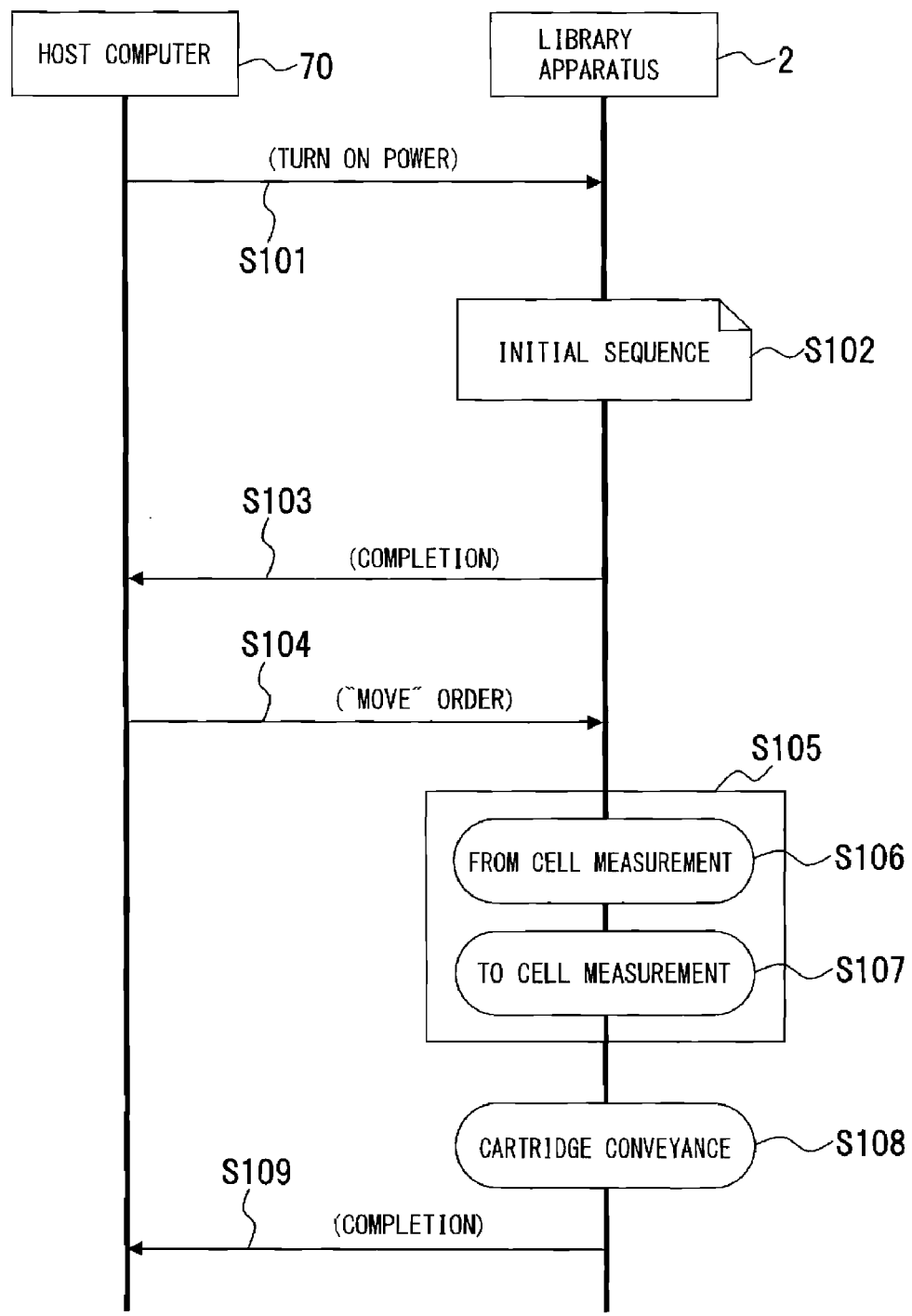
FIG. 22 depicts process sequences of a host computer and the library apparatus.
Figure 23:
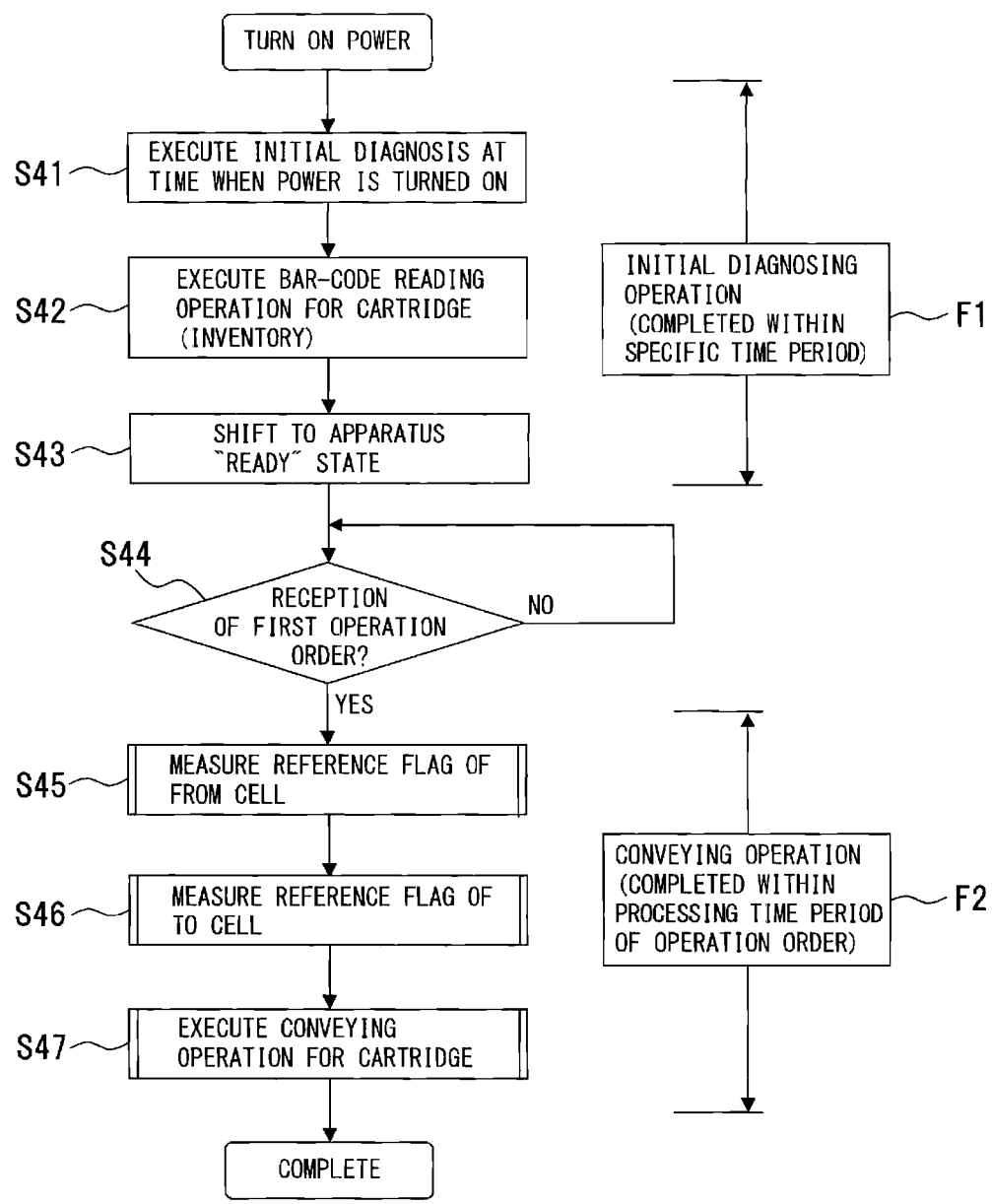
FIG. 23 is a flowchart of a process procedure of the reference flag measurement during a conveying operation.

Reference flag measurement in response to an operation order will be described with reference to FIGS. 22 and 23. FIG. 22 depicts process sequences of the host computer and the library apparatus. FIG. 23 is a flowchart of a process procedure of the reference flag measurement during a conveying operation.

When an instruction to turn on the power is sent from the host computer 70 to the library apparatus 2 (step S101), an initial sequence is in the library apparatus 2 executes (step S102). When the initial sequence is completed, the completion is notified from the library apparatus 2 to the host computer 70 (step S103).

The host computer 70 receives the completion notification, and an operation order is issued to the library apparatus 2 (step S104) and a cell measuring process is executed (step S105). In the cell measuring process, "From cell measurement" is executed as measurement of a corresponding cell when the cartridge 4 is taken out (step S106) and "To cell measurement" is executed as measurement of a corresponding cell when the cartridge 4 is put in (step S107). After these measurements, cartridge conveyance is executed (step S108). When the cartridge conveyance is completed, the completion is notified from the library apparatus 2 to the host computer 70 (step S109).

Corresponding to the above, as depicted in FIG. 23, the process procedure of the library apparatus 2 includes an initial diagnosing operation (stage F1) and a conveying operation (stage F2). The initial diagnosing operation (stage F1) is a process that is completed within a specific time period after the power is turned on. The conveying operation (stage F2) is a process that is completed within a processing time period in response to an operation order. Each of the operations will be continuously described in detail.

When the power is turned on, the initial diagnosing operation is executed (stage F1). In the initial diagnosing operation (stage F1), initial diagnosis at the time when the power is turned on (step S14) and a bar-code reading operation for the cartridge 4 is executed (step S42). When the bar-code reading for the cartridge 4 is enabled, the initial diagnosing operation (F1) is normally ended and the library apparatus 2 is shifted to the apparatus standby state where the library apparatus 2 can receive an order from the host computer 70 (step S43).

In the standby state, reception of a first operation order from the host computer 70 after the turning on of the power is monitored (step S44). When the operation order is received (YES of step S44), the measuring operation and the conveying operation of the reference flags are executed within a processing time period set in the operation order. That is, in response to the first operation order after the power is turned on, the reference flag of a From (taking out) cell is measured (step S45), the reference flag of a To (putting in) cell is measured (step S46), the conveying operation for the cartridge 4 is executed (step S47), and the measurement of the reference flags is ended.

Figure 24:
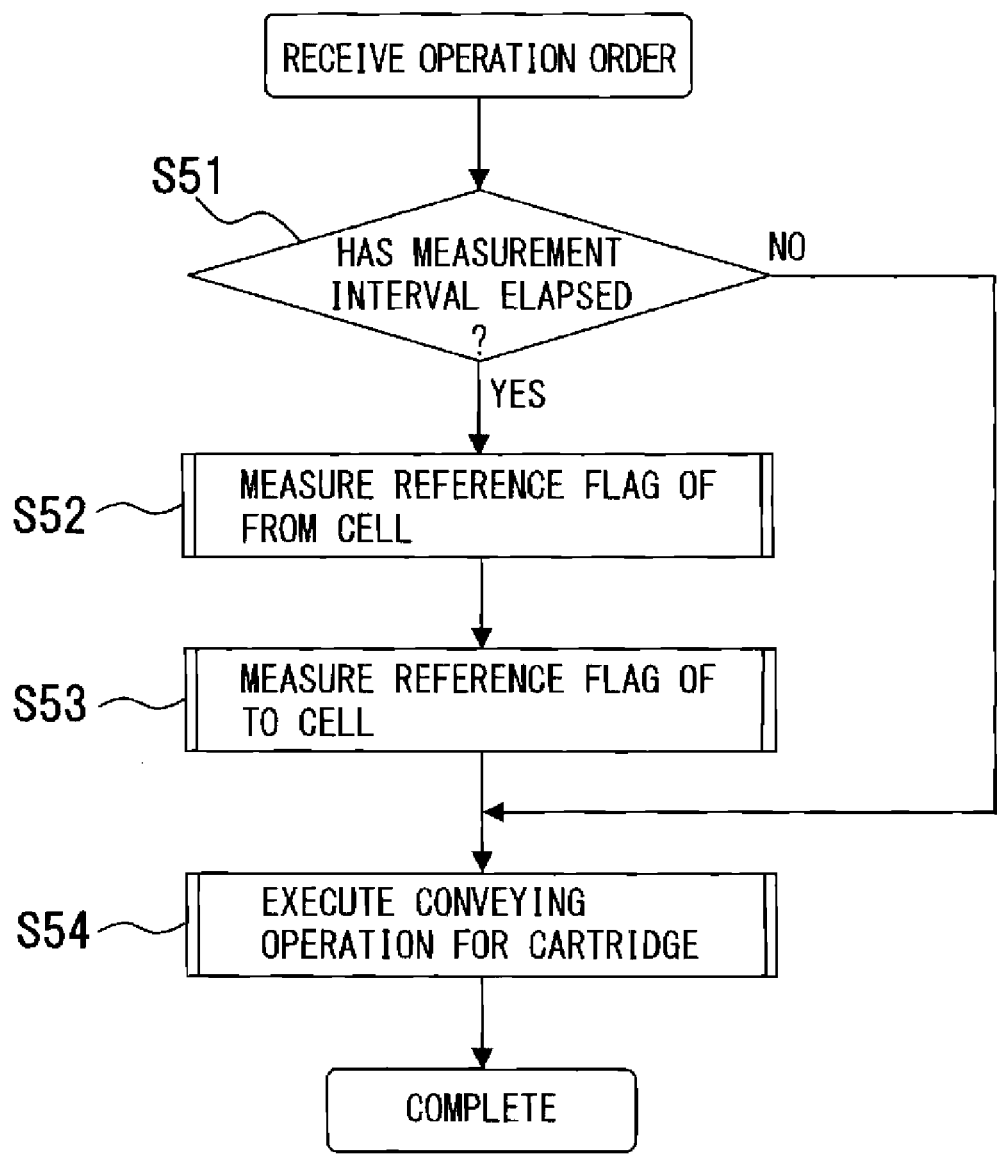
FIG. 24 is a flowchart of a process procedure of a process executed within a specific time period after an operation order.

A process within a specific time period after the operation order will be described with reference to FIG. 24. FIG. 24 is a flowchart of a process procedure of the process within the specific time period after the operation order.

The process procedure is a process procedure that is executed by a computer process of the library system 60 and is a measuring process of the reference flags within the specific time period after the operation order is received.

When the operation order is received, whether a measurement interval has elapsed is determined (step S51). If the measurement interval has elapsed (YES of step S51), the reference flag of the From (taking out) cell is measured (step S52), the reference flag of the To (putting in) cell is measured (step S53), the conveying operation for the cartridge 4 is executed (step S54), and the measurement of the reference flags is ended.

If the measuring interval has not elapsed at step S51 (NO of step S51), the conveying operation for the cartridge 4 is executed without executing the processes of steps S52 and S53 (step S54) and the measurement of the reference flags is ended.

Figure 25:
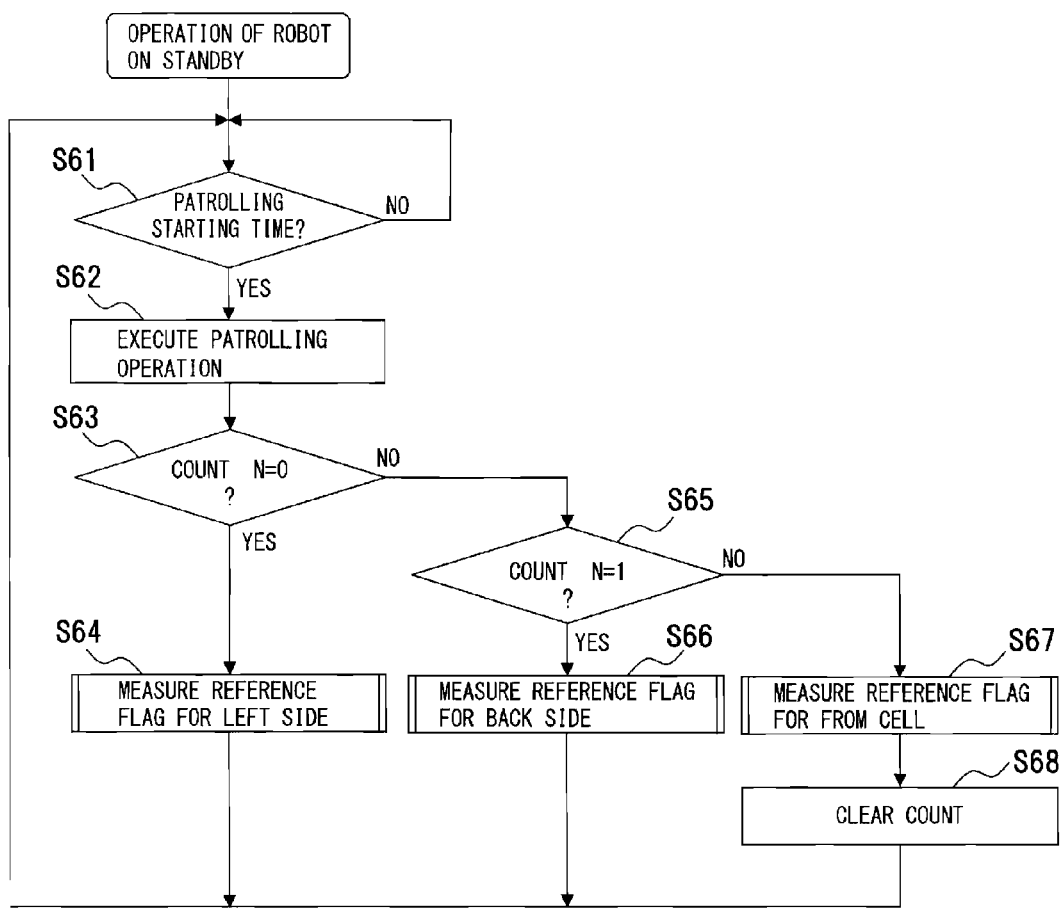
FIG. 25 is a flowchart of a process procedure of the reference flag measurement by a patrolling operation of a robot on standby.

A patrolling operation of the robot on standby will be described with reference to FIG. 25. FIG. 25 is a flowchart of a process procedure of the reference flag measurement by a patrolling operation of the robot on standby.

The process procedure is a measuring process of the reference flags by the patrolling operation of the robot 6 or 8 on standby. The process includes a process of increasing the count of a counter in the CPU 72 or 80 based on the reference flag measurement for the left side, further increasing the count based on the reference flag measurement for the back side, and clearing the count based on the next reference flag measurement.

In the process procedure, whether a patrolling starting time arrives is determined (step S61) and the patrolling starting time is waited for arriving. When the patrolling starting time arrives (YES of step S61), the patrolling operation is executed (step S62) and whether a count value N of the counter in the CPU 72 or 80 is N=0 is determined (step S63). When the count value N is N=0 (YES of step S63), the reference flag measurement for the left side is executed (step S64), the count of the counter is increased (+1), and the procedure returns to step S61. The case where the count value N is 0 indicates the reference flag measurement for the left side. The case where the count value N is 1 indicates the reference flag measurement for the back side. The count value N is increased based on the reference flag measurement for the back side and becomes 2. Therefore, the count value N that is N≠1 (N=2) indicates the reference flag measurement for the From (taking out) cell.

At step S63, when the count value N is N≠0 (NO of step S63), whether the count value N=1 is determined (step S65). When the count value N is 1 (YES of step S65), the reference flag measurement for the back side is executed (step S66), the count of the counter is increased (+1), and the procedure returns to step S61.

At step S65, when the count value N is N≠1 (NO of step S65), the reference flag measurement for the From (taking out) cell is executed (step S67), and count clearing is executed (step S68). The procedure returns to step S61 and the next patrolling starting time is waited for arriving.

Figure 26:
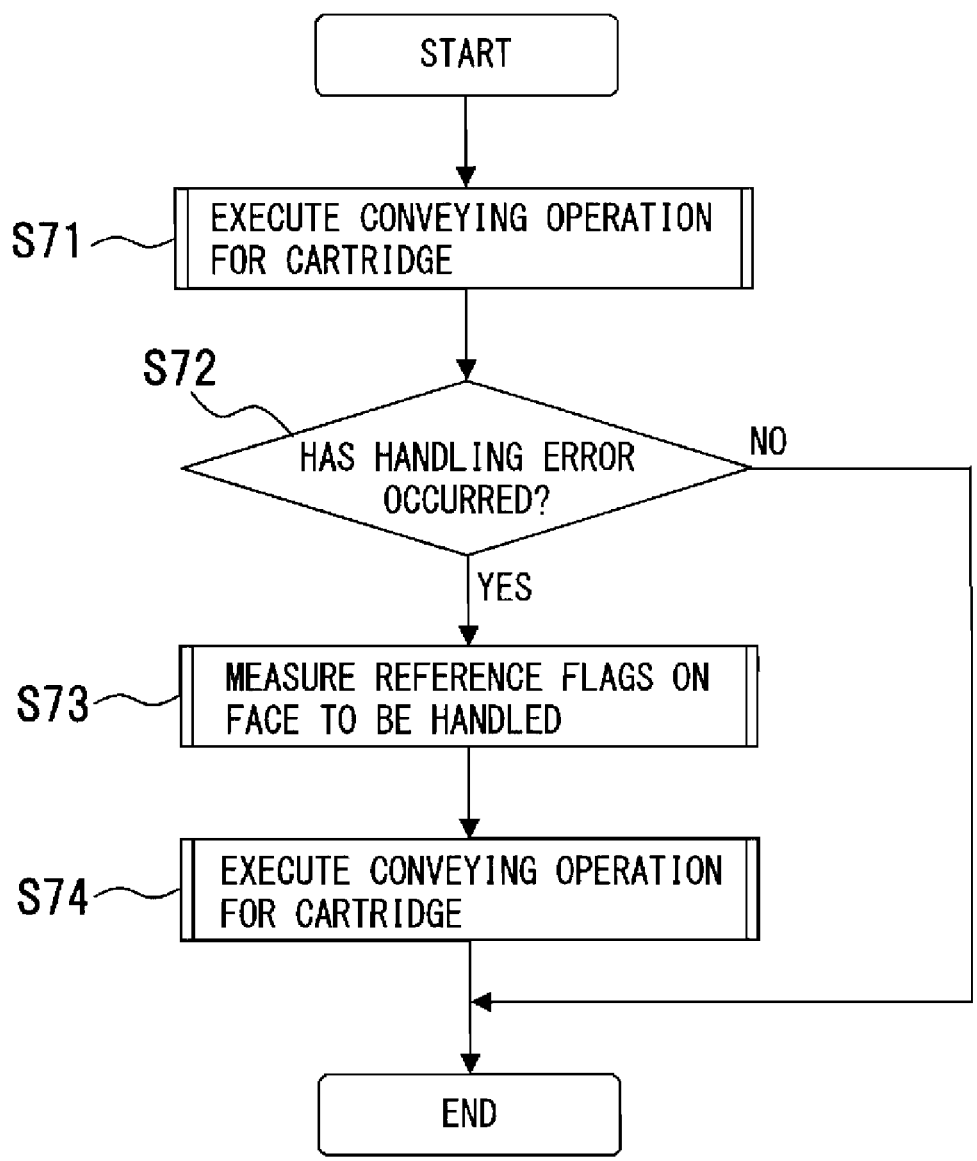
FIG. 26 is a flowchart of a process procedure of the reference flag measurement executed when a handling error occurs.

The reference flag measurement executed when a handling error occurs will be described with reference to FIG. 26. FIG. 26 is a flowchart of a process procedure of the reference flag measurement executed when a handling error occurs.

The process procedure includes a process of determining whether any handling error has occurred and measuring the reference flag based on the determination.

The conveying operation for the cartridge 4 is executed based on the start of the operation (step S71) and whether any handling error has occurred is determined during the conveying operation (step S72). When a handling error occurs (YES of step S72), the reference flags on the face to be handled are measured (step S73). The conveying operation for the cartridge 4 is executed (step S74) and the operation is ended.

At step S72, when no handling error occurs (NO of step S72), the operation is ended without executing the processes of steps S73 and S74.

Figure 27:
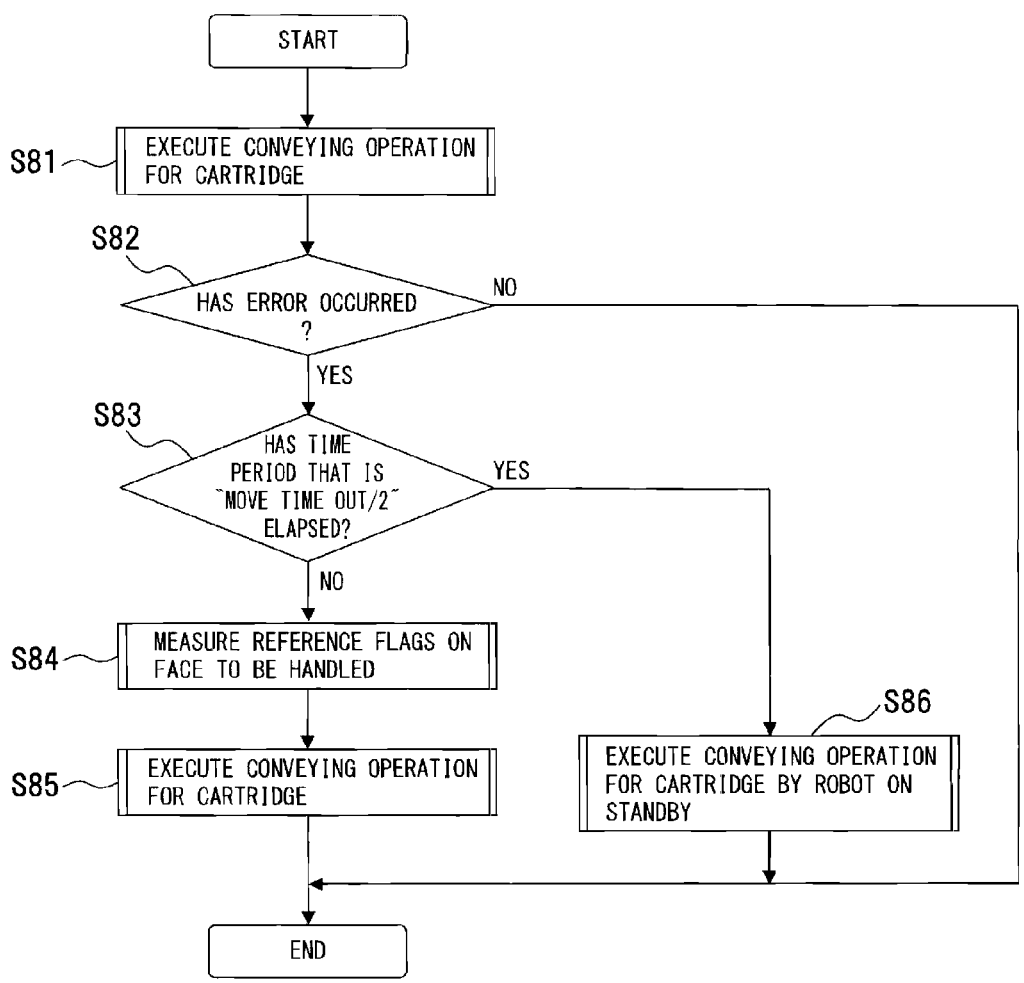
FIG. 27 is a flowchart of a process procedure of an operation executed when an operation timeout time approaches.

An operation executed when the operation timeout time approaches will be described with reference to FIG. 27. FIG. 27 is a flowchart of a process procedure of the operation executed when the operation timeout time approaches.

The process procedure represents an operation executed when an error occurs in the process procedure executed when the operation timeout time approaches.

In the process procedure, the conveying operation for the cartridge 4 is executed based on the start of the operation (step S81) and occurrence of an error is monitored (step S82). When an error occurs (YES of step S82), whether a time period that is a half of the time period to the operation timeout (error recovery execution time period) has elapsed is determined (step S83). If the above time period has not elapsed (NO of step S83), the reference flags of the face to be handled are measured (step S84), the conveying operation for the cartridge 4 is executed (step S85), and the operation is ended.

At step S82, when no error occurs (NO of step S82), the operation is ended without executing the processes of steps S83 to S85. If the error recovery execution time period has elapsed at step S83 (YES of step S83), the conveying operation for the cartridge 4 is executed in the robot 6 or 8 that is set to be the robot on standby (step S86) and the operation is ended. In the embodiment, an error recovery process such as the measurement of the reference flags is first executed for the robot for operation until the error recovery execution time period elapses and, thereby, temporary abnormality, etc., can be recovered and the robot for operation can be continuously operated. In addition, the measuring process for the reference flags is executed at specific time intervals for the robot on standby (the patrolling operation) and, therefore, even when the robot for operation is not only temporarily abnormal but also is unable to continue to be operated, the process can be quickly handed over to the robot on standby before the timeout occurs. Though the time period that is a half of the time period to the operation timeout is set to be the error recovery execution time period, the error recovery execution time period can naturally be varied based on the position of the robot and the position of the cell that is an operation destination.

Characteristic items and advantages in the first embodiment will be listed as follows.

(1) The process procedure of the alignment adjustment is executed by rewriting reference values using the correction values obtained in the above correction equations (11) to (14) and, therefore, can be quickly executed without needing any special process procedure when occurrence of a shift is found.

(2) The robot 6 or 8 is adapted to have the two shafts that cross each other at a right angle on the horizontal plane and that are for the linear motions, and the shaft for the rotary motion that is mounted on the two shafts. Thereby, a shift of the alignment of the robot 6 or 8 can be corrected by reading the reference flags 18A to 18C when variation of an apparatus installation environment or variation due to aging is present.

(3) The flag that is in the vicinity of the robot 6 or 8 is read when the robot 6 or 8 moves and, when the shift is large, it is determined that the positioning is varied, and the measurement of the reference flags 18A to 18C is executed. Thereby, the alignment adjustment can be executed.

(4) In the above alignment adjustment, the initial diagnosing operation executed when the power of the apparatus is turned on is avoided and, when the first cartridge conveyance order is issued from the host computer 70 to the robot 6 or 8, the reference flags 18A to 18C on the face to be handled of the accommodating shelf 10 are measured. Therefore, the alignment adjustment does not obstruct the main operation and influence on the operation and use of the library can be avoided.

(5) Taking into consideration the state variation due to aging of the robots, the alignment adjustment may be adapted to be executed in a specific time period after the power is turned on.

(6) As to the robot on standby, in the case where a failover process of the robot occurs, the failover process is executed when the conveying process for the cartridge 4 is executed. In this case, when the timeout is established for the host computer 70, the reference flag measurement for one face of the reference flags 18A to 18C in the three faces may be executed, for exempla, during the patrolling operation of the robot mechanism unit executed once a day.

(7) In the case where an error in handling the cartridge is detected during the conveying operation for the cartridge 4, a quick alignment adjustment can also be executed when the measurement of the flags in the face to be handled is executed.

(8) In the case where the flags are measured, if the time period that is, for example, a half of the timeout value issued from the host computer 70 has elapsed, the robot 6 or 8 may execute the failover process without advancing to the measuring operation. Thereby, the host computer 70 can be prevented from suffering the timeout.

(9) When a difference in the measured values is large between the flags on the measurement starting side (the side closer to the reader) and the flags on the measurement ending side (the side farther from the reader) as the result of the measurement of the reference flags 18A to 18C, it is determined that the robot 6 or 8 is curved. In this case, the measured values of the three reference flags 18A to 18C may be used and the alignment adjustment may be executed by correction using an approximate straight line obtained from the measured values.

Second Embodiment

Figure 28:
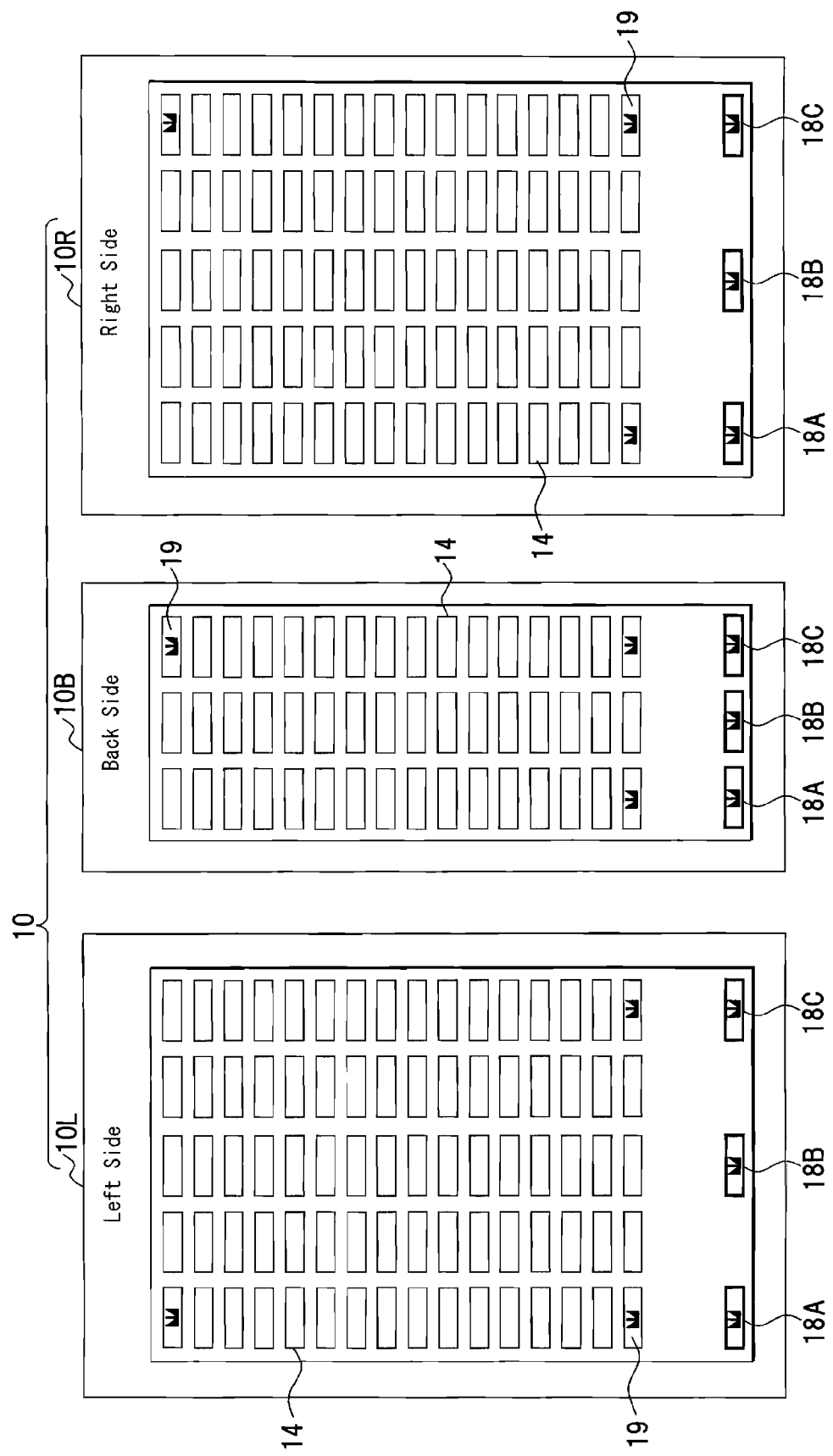
FIG. 28 is a diagram of exemplary installation of an accommodating shelf and reference flags of a library apparatus according to a second embodiment.

A second embodiment of the present invention will be described with reference to FIG. 28. FIG. 28 is a diagram of exemplary installation of an accommodating shelf and reference flags of a library apparatus. In FIG. 28, the same components as those of FIG. 1 and FIG. 6 are given the same reference numerals.

In the first embodiment, the cells 14 in each of the left-side and the right-side accommodating shelves 10L and 10R of the accommodating shelf 10 are divided into the cell groups 141 to 143 and the reference flag displaying units 16 are installed above and beneath the left-side, the back-side and the right-side accommodating shelves 10L, 10B and 10R (FIG. 6). However, as in the second embodiment (FIG. 28): each of the left-side, the back-side and the right-side accommodating shelves 10L, 10B and 10R may be adapted to include a single cell group and may be adapted to be only installed thereunder with the reference flags 18A to 18C; and each of the single cell groups may be adapted to be installed with three cell flags 19. Thereby, the same effect can be obtained.

Third Embodiment

Figure 29:
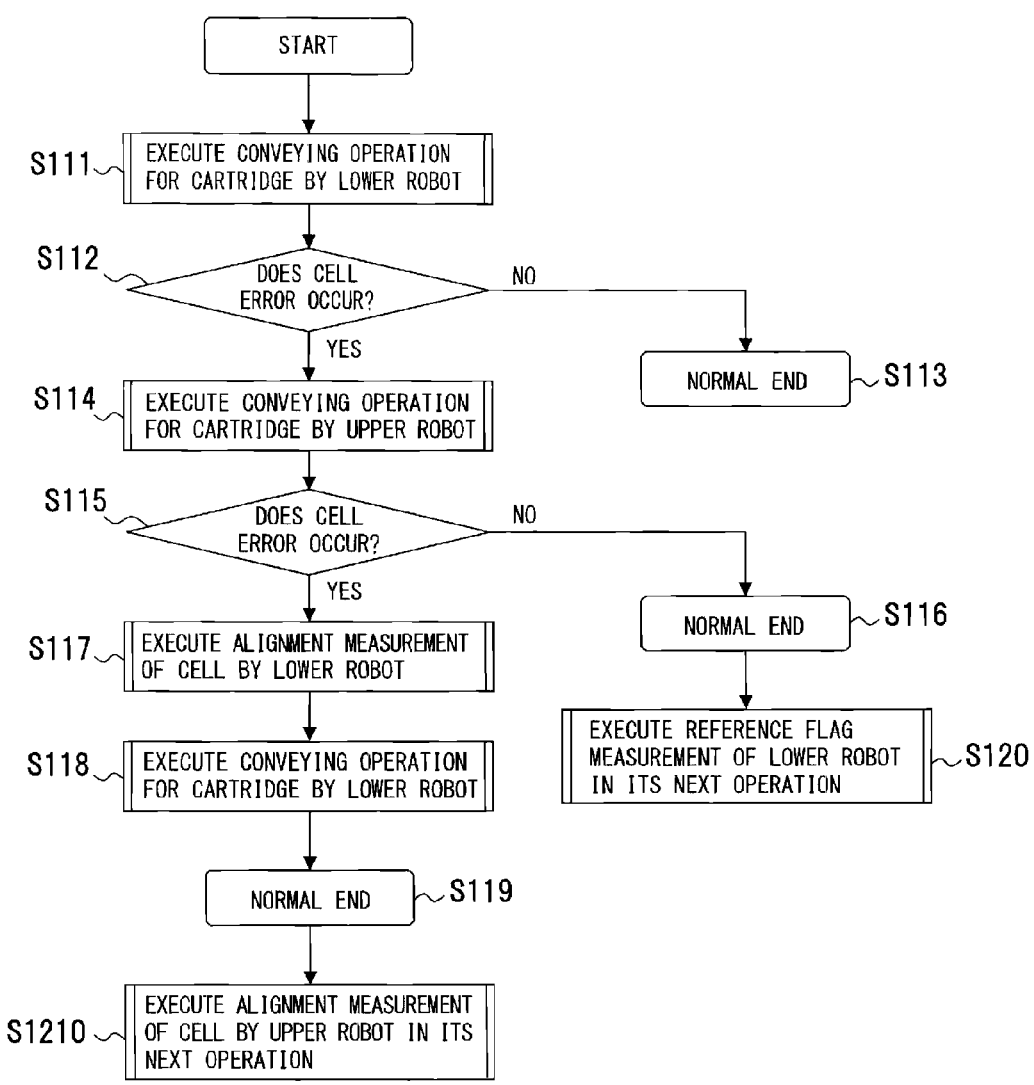
FIG. 29 is a flowchart of a process procedure of an operation according to a third embodiment.
Figure 30:
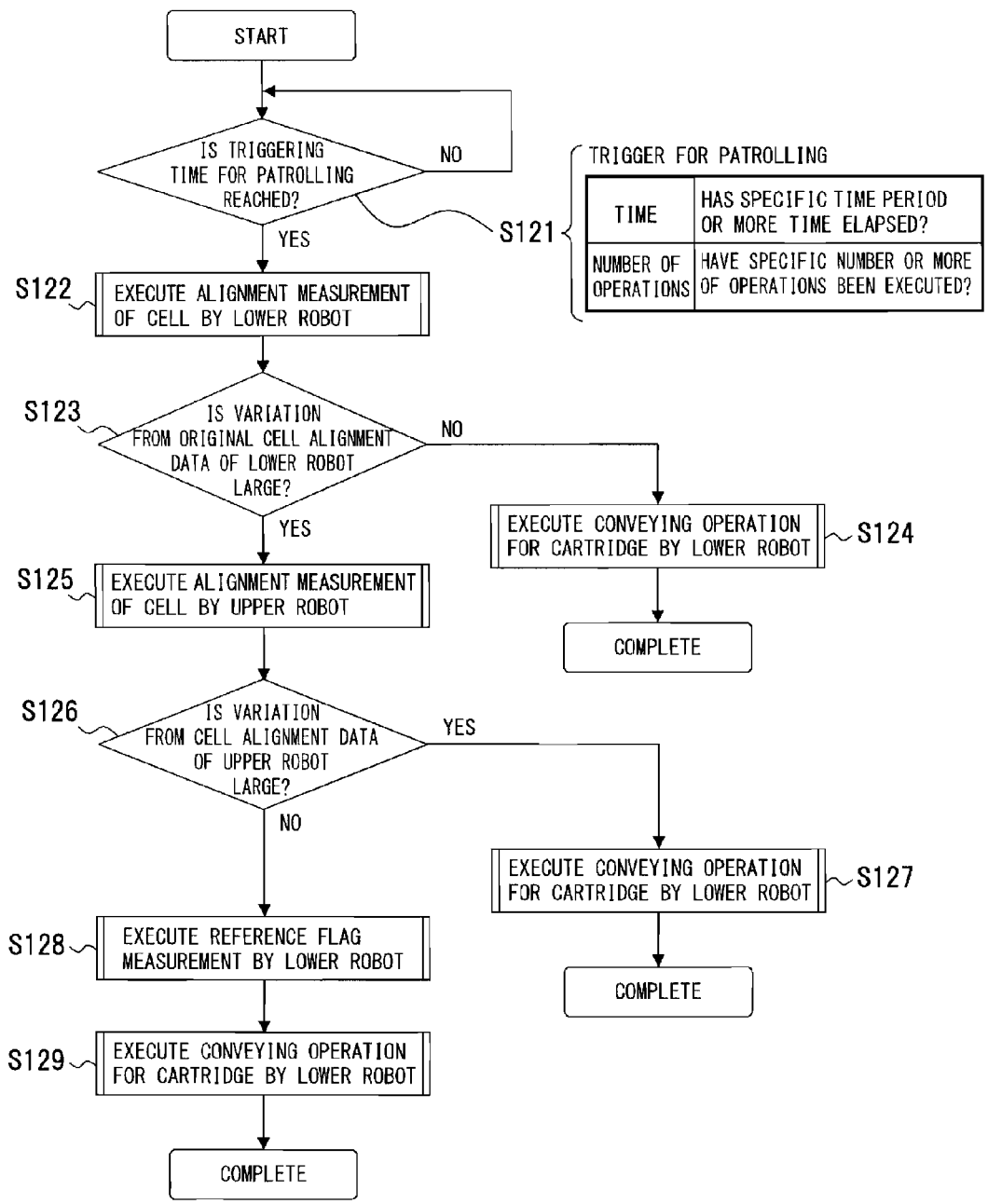
FIG. 30 is a flowchart of a process procedure of operation monitoring, robot switching and a measuring operation.

A third embodiment of the present invention will be described with reference to FIGS. 29 and 30. FIG. 29 is a flowchart of a process procedure of an operation according to the third embodiment. FIG. 30 is a flowchart of a process procedure of operation monitoring, robot switching and a measuring operation.

In the first and the second embodiments, the premise is that the reference flag measurement is executed when cell access abnormality occurs. However, the third embodiment (FIG. 29) is the case where at least two conveying robots are included. In the case where the robots 6 and 8 are adapted respectively as a lower robot and an upper robot to be mounted above and under each other as represented by the first embodiment (FIGS. 2 and 4), when cell access abnormality occurs during the operation of, for example, the upper robot, that is, the robot 8, the other robot, that is, the robot 6 that is the lower robot executes an access before the reference flag measurement is executed. When errors occur to both of the robots 6 and 8, it is determined to be caused not by variation due to aging of the robots but by variation due to aging of the accommodating shelf (that is attached with cells), and the reference flags are not measured but re-measurement of the cell flags to be handled are executed and, thereby, an alignment adjustment is executed. In this embodiment, the processes of the first embodiment (FIGS. 1 to 27) are executed in addition to executing the re-measurement of the cell flags.

The process procedure includes a process of determining whether to be the variation due to aging of the robots or the variation due to aging of the cell, using the upper and the lower robots. As depicted in FIG. 29, the conveying operation for the cartridge is executed in the lower robot (the robot 6) (step S111) and whether a cell error occurs during the execution thereof is monitored (step S112). When no cell error occurs (NO of step S112), the procedure is normally ended (step S113). When a cell error occurs (YES of step S112), the robot to access is switched to the upper robot (the robot 8) and the cartridge conveying operation is executed in the upper robot (step S114). Whether a cell error occurs during the execution thereof is monitored (step S115).

When no cell error occurs (NO of step S115), the procedure is normally ended (step S116). In this case, no cell access abnormality occurs to the upper robot and, therefore, the cell access abnormality has occurred to the lower robot.

When a cell error also occurs to the upper robot (YES of step S115), errors occur to both of the robots 6 and 8. In this case, it is determined that the errors are caused not by the variation due to aging of the robots but by the variation due to aging of the accommodating shelf. In this case, the robot to access is switched to the lower robot (the robot 6) and alignment measurement of the cell is executed in the lower robot (step S117). The cartridge conveying operation is executed in the lower robot (step S118) and the procedure is normally ended (step S119).

When the procedure is normally ended (step S116) after the occurrence of the cell error to the lower robot (YES of step S112), the reference flag measurement of the lower robot is executed in its next operation (step S120). This reference flag measurement is same as that of the first embodiment.

When the procedure is normally ended (step S119) after the conveying operation for the cartridge is executed in the lower robot (step S118), the alignment measurement of the cell (cell flag measurement) is executed in the upper robot in the next operation (step S1210).

In the process procedure depicted in FIG. 30, as to determining whether to be the variation due to aging of the robot or the variation due to aging of the cell, the variation due to aging of the cell is detected by the patrolling. The monitoring of the variation due to aging is triggered by, for example, time or the number of operations. That is, as to the time, whether a specific time period or more time has elapsed is determined at step S121 and, as to the number of operations, whether a specific number or more of operations have been executed is determined similarly at step S121. Based on such determination, the processes after step S121 are executed.

In the process procedure, the operation is started and whether the trigger for the patrolling is reached is monitored (step S121). The trigger for the patrolling is time or the number of operations, and both of them may also be concurrently monitored and may also be handled as the trigger for the patrolling.

When the trigger for the patrolling is reached at step S121 (YES of step S121), the alignment measurement of the cell is executed in the lower robot (step S122) and whether a variation between the result of the execution of the alignment measurement and the original cell alignment data of the lower robot is large is determined (step S123).

When the variation between the result and the original cell alignment data of the lower robot is not large (NO of step S123), it is determined that no variation due to aging is present. The cartridge conveying operation is executed in the lower robot (step S124) and the operation is ended.

When the variation between the result and the original cell alignment data of the lower robot is large (YES of step S123), it is determined that abnormality has occurred to the lower robot. The lower robot is switched to the upper robot and the alignment measurement of the cell is executed in the upper robot (step S125) and whether the variation between the result of the alignment measurement and the cell alignment data of the upper robot is large is determined (step S126).

When the variation between the result and the cell alignment data of the upper robot is large (YES of step S126), it is determined that the cell has varied due to aging and the cartridge conveying operation is executed in the lower robot (step S127), and the operation is ended.

When the variation between the result and the cell alignment data of the upper robot is not large (NO of step S126), it is determined that the lower robot has varied due to aging. The reference flag measurement of the lower robot is executed (step S128) and the cartridge conveying operation is executed in the lower robot (step S129), and the operation is ended.

In the library apparatus including the above two robots 6 and 8, whether to be the variation due to aging of the robot or the cell can be identified by alternately executing the stepwise operation monitoring of the two robots 6 and 8 and the alignment measurement and, thereby, the cell access abnormality caused by the variation due to aging can be coped with and a proper process can be executed. Therefore, highly reliable conveying operations can be secured.

As above, according to a configuration mounted thereon with robots above and under each other like the robots 6 and 8, when cell access abnormality occurs, a robot in operation that is, for example, a robot other than the robot 8, that is, the robot 6 in the above embodiment executes the cell access before executing the reference flag. When cell access abnormality occurs to each of both of the robots 6 and 8, it is determined that the abnormality is caused not by variation due to aging of the robots but by variation due to aging of the accommodating shelf 10, that is, a locker (to be attached with the cells). Therefore, the reference flags are not measured and the cell flags to be handled are re-measured and, therefore, the alignment adjustment can be executed based on the re-measurement result. Therefore, highly reliable and stable handling can be realized.

Other Embodiments

In the above embodiments: the number of cells in the lateral direction of each of the left-side, the back-side and the right-side accommodating shelves 10L, 10B and 10R is set to be, for example, five; the reference flags 18A and 18C are installed at the ends of a cell row; the reference flag 18B is installed at the center of a cell row; and the inclination of the robot 6 or 8 is obtained by proportionally distributing the measured values of the reference flags 18A to 18C using the positions of the cells 14 (FIG. 15 and its description). However, a reference flag may be installed in each cell, the inclination of the robot 6 or 8 may be obtained for each cell, and an alignment adjustment may be executed individually for each cell.

In the above embodiments, the library apparatus 2 that stores the cartridges 4 as objects to be conveyed is exemplified. However, the present invention may also be applied to a storing apparatus that stores objects to be conveyed other than the cartridges 4, a delivering apparatus, etc. The objects to be conveyed are not limited to the cartridges and the alignment adjusting apparatus and the alignment adjusting method are not limited to those for the library apparatus.

In the above embodiments, the reference data that represents the cells and the reference flags is exemplified in FIGS. 7 and 8. However, the present invention is not limited to such reference data and simple position data representing a plurality of positions may naturally be used as the reference data.

In the above embodiments, the above conditions 1 and 2 are exemplified as the starting conditions of the measurement of the reference flag. However, the number of times of issuance of the operation order may be counted and a reference value to start the measurement may be provided for the counted value and may be used as a measurement starting condition.

In the above embodiment (FIG. 23), the measurement of the reference flags is executed when the first operation order is received from the host computer 70 after the power is turned on, and the measurement of the reference flags is executed in response to the operation order. However, the measurement of the reference flags may be executed at specific intervals or every time an operation order is received.

In the above embodiment, the library apparatus that includes the robots above and under each other of the robots 6 and 8 respectively as the lower robot and the upper robot is exemplified. However, the present invention is not limited to an apparatus that includes the above two conveying robots and may be applied to a library apparatus that includes one or three or more conveying robots and a conveying apparatus that uses the conveying robot(s).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

Technical ideas that are extracted from the above embodiments of the present invention will be listed. The technical ideas according to the present invention can be grasped at various levels and in various variations from their generic concept to their limitative concepts. Therefore, the present invention is not limited by the following description.

An alignment adjusting apparatus of a robot to execute conveying operations of putting and taking an object to be conveyed in and out of an accommodating shelf includes at least two reference flags to be installed in the accommodating shelf; a flag measuring unit to measure the reference flags on the robot positioned at the reference flags; and an alignment adjusting unit to adjust an alignment shift of the robot corresponding to an inclination of the robot, the inclination being obtained from a variation of a measured value of each of the reference flags by the flag measuring unit.

According to the above configuration, the alignment adjustment is executed using the measurement of the reference flags against the alignment shift caused by the installation environment of the robots or variation due to aging of the robots. Therefore, the alignment adjustment can be executed without influencing the host computer and the handling of the robots can be stabilized.

In the above alignment adjusting apparatus, preferably, the measurement of the reference flags by the flag measuring unit may be executed triggered by establishment of a measurement condition, and the measurement condition may be established by a lapse of a specific time period from the measurement of the reference flags or occurrence of a handling error to the robot. The flag measuring unit may position the robot at a flag that is closest to a current position of the robot and, when a variation of the flag detected is large, measure the reference flags on a face to be handled that is installed with the flag. The flag measuring unit may measure the reference flags on a face to be handled based on a first cartridge conveyance order to the robot. The flag measuring unit may measure the reference flags on the face to be handled of the accommodating shelf within a specific time period after power is turned on. The above alignment adjusting apparatus may include a plurality of robots, wherein the reference flags are measured using the flag measuring unit mounted on a robot on standby based on a patrolling operation of a robot mechanism unit. The above alignment adjusting apparatus may include a time counting unit to count a time period for the measurement of the reference flags; and a control unit to, when the time counting unit counts a predetermined time period to enter a timeout from a host computer, finish a measuring operation for the reference flags before entering the timeout. The control unit may cause a robot on standby to take over the conveying operation when the control unit finishes the measuring operation for the reference flag. The alignment adjusting unit may capture a measurement result for the reference flags at a plurality of points and, when a difference between a plurality of measured values is large, execute the alignment adjustment using at least two of the measured values.

An alignment adjusting apparatus includes at least two robots to execute conveying operations of putting and taking an object to be conveyed in and out of an accommodating shelf; a reference flag to be installed in the accommodating shelf; a cell flag to be installed in a cell of the accommodating shelf; and a flag measuring unit to, when abnormality of cell access occurs to one of the robots, switch the robot to another robot to cause said another robot to execute the cell access before measurement for the reference flag and, when abnormality of the cell access occurs to two of the robots, measure the cell flag to be handled before the measurement of the reference flag.

According to the above configuration, when cell access abnormality occurs to one robot, the robot is switched to the other robot and the other robot is caused to access and, when access abnormality also occurs to the other robot, the cell flags to be handled are measured. Therefore, whether abnormality occurs to the robots or to the accommodating shelf can be grasped and, for example, whether variation due to aging has occurred to the robots or the accommodating shelf can be identified.

In the above alignment adjusting apparatus, preferably, the flag measuring unit may determine variation due to aging of the cell and re-measures the cell flag to be handled when an error occurs to each of a plurality of the robots.

A library apparatus to include a robot that conveys a cartridge includes an accommodating shelf to accommodate the cartridge; at least one reference flag to be installed in the accommodating shelf; a flag measuring unit to measure the reference flag on the robot positioned at the reference flag; and an alignment adjusting unit to adjust an alignment shift of the robot corresponding to an inclination of the robot, the inclination being obtained from a result of the measurement by the flag measuring unit.

The above library apparatus preferably may include an alignment adjusting apparatus of a robot to execute conveying operations of putting and taking an object to be conveyed in and out of an accommodating shelf having at least two reference flags to be installed in the accommodating shelf; a flag measuring unit to measure the reference flags on the robot positioned at the reference flags; and an alignment adjusting unit to adjust an alignment shift of the robot corresponding to an inclination of the robot, the inclination being obtained from a variation of a measured value of each of the reference flags by the flag measuring unit.

A library apparatus includes at least two robots to execute conveying operations of putting and taking an object to be conveyed in and out of an accommodating shelf; a reference flag to be installed in the accommodating shelf; a cell flag to be installed in a cell of the accommodating shelf; and a flag measuring unit to, when abnormality of cell access occurs to one of the robots, switch the robot to another robot to cause said another robot to execute the cell access before measurement of the reference flag and, when abnormality of the cell access occurs to two of the robots, measure the cell flag to be handled before the measurement of the reference flag.

In the above library apparatus, preferably, the flag measuring unit may determine variation due to aging of the cell and re-measures the cell flag to be handled when errors occur to a plurality of the robots.

An alignment adjusting method of a robot to put and take an object to be conveyed in and out of an accommodating shelf includes measuring at least one reference flag on the robot positioned to the reference flag that is installed in the accommodating shelf; and adjusting an alignment shift of the robot corresponding to an inclination of the robot, the inclination being obtained from a measured value obtained at said measuring.

In the above alignment adjusting method, preferably, said measuring may set a measurement condition to trigger the measurement of the reference flag and, when the measurement condition is established, the reference flag may be measured. The measurement condition may be established by a lapse of a specific time period from the measurement of the reference flag or occurrence of a handling error to the robot. The robot may be positioned at a flag that is closest to a current position of the robot and, when a variation of the flag detected is large, the reference flag on a face to be handled that is installed with the flag may be measured. The reference flag on the face to be handled may be measured based on a first cartridge conveyance order to the robot. The reference flag on the face to be handled of the accommodating shelf may be measured within a specific time period after power is turned on. The reference flag may be measured using a robot on standby of a plurality of the robots, based on a patrolling operation of a robot mechanism unit. When a predetermined time period to enter a timeout from a host computer connected to a library apparatus elapses, a measuring operation for the reference flag may be finished before entering the timeout. Measured values of the reference flags at a plurality of points may be captured, and when a difference between a plurality of the measured values is large, the alignment adjustment may be executed using at least two of the measured values.

An alignment adjusting method for an apparatus to include at least two robots that put and take an object to be conveyed in and out of an accommodating shelf includes switching, when abnormality of cell access occurs, a robot when the abnormality thereof occurs to another robot and causing said another robot to execute the access before measuring a reference flag and, when errors occur to a plurality of the robots, measuring a cell flag to be handled.

In the above alignment adjusting method, preferably, said switching and measuring may determine variation due to aging of the cell and re-measures the cell flag to be handled, when errors occur to a plurality of the robots.

According to the embodiments of the present invention, the following effects can be achieved.

(1) An alignment adjustment of robots that put or take objects to be conveyed in/out of an accommodating shelf can be automated and, therefore, their stable handling can be obtained.

(2) The alignment adjustment of robots of a library apparatus can be automated without influencing a host computer that is connected to the library apparatus and, therefore, stability of their handling can be facilitated.

(3) The alignment adjustment can be executed by only measuring reference flags when the robots are replaced and any alignment measurement for the whole apparatus does not need to be executed and, therefore, the alignment adjustment can be executed without influencing the time necessary to respond from the library apparatus to the host computer.

(4) When at least two conveying robots are included, a proper alignment adjustment can be executed such as identifying whether cell access abnormality is caused by variation due to aging of the robots or cells by selecting the conveying robots. Therefore, the reliability of the conveying operations can be improved.

The embodiments of the present invention have been described as above. However, the present invention is not limited by the above description. Various variations and changes may naturally be made to the present invention by those skilled in the art based on the gist of the present invention described in claims or disclosed herein and, not to mention, such variations and changes are encompassed in the scope of the present invention.

What is claimed is:

1. An alignment adjusting apparatus, comprising:
   at least two reference flags to be installed in an accommodating shelf;
   a flag measuring unit to measure the reference flags on a robot positioned at the reference flags, the robot executing conveying operations of putting and taking an object to be conveyed in and out of the accommodating shelf;
   a curving detection unit to detect curving the robot based on an inclination of the robot, the inclination being obtained from a variation of a measured value of each of the reference flags by the flag measuring unit; and
   an alignment adjusting unit to adjust an alignment shift due to the curving occurring to the robot.

2. The alignment adjusting apparatus of claim 1, wherein
   the measurement of the reference flags by the flag measuring unit is executed triggered by establishment of a measurement condition, and wherein
   the measurement condition is established by a lapse of a specific time period from the measurement of the reference flags or occurrence of a handling error to the robot.

3. The alignment adjusting apparatus of claim 1, wherein
   the flag measuring unit measures the reference flags on a face to be handled based on a first cartridge conveyance order to the robot.

4. The alignment adjusting apparatus of claim 1, wherein
   the flag measuring unit measures the reference flags on the face to be handled of the accommodating shelf within a specific time period after power is turned on.

5. The alignment adjusting apparatus of claim 1, further comprising
   a plurality of robots, wherein
   the reference flags are measured using the flag measuring unit mounted on a robot on standby based on a patrolling operation of a robot mechanism unit.

6. The alignment adjusting apparatus of claim 1, wherein
   the alignment adjusting unit captures a measurement result for the reference flags at a plurality of points and, when a difference between a plurality of measured values is large, executes the alignment adjustment using at least two of the measured values.

7. An alignment adjusting apparatus, comprising:
   at least two reference flags to be installed in an accommodating shelf;
   a flag measuring unit to measure the reference flags on a robot positioned at the reference flags, the robot executing conveying operations of putting and taking an object to be conveyed in and out of the accommodating shelf; and
   an alignment adjusting unit to adjust an alignment shift of the robot corresponding to an inclination of the robot, the inclination being obtained from a variation of a measured value of each of the reference flags by the flag measuring unit, wherein
   the flag measuring unit positions the robot at a flag that is closest to a current position of the robot and, when a variation of the flag detected is large, measures the reference flags on a face to be handled that is installed with the flag.

8. An alignment adjusting apparatus, comprising:
   at least two reference flags to be installed in an accommodating shelf;
   a flag measuring unit to measure the reference flags on a robot positioned at the reference flags, the robot executing conveying operations of putting and taking an object to be conveyed in and out of the accommodating shelf;
   an alignment adjusting unit to adjust an alignment shift of the robot corresponding to an inclination of the robot, the inclination being obtained from a variation of a measured value of each of the reference flags by the flag measuring unit;
   a time counting unit to count a time period for the measurement of the reference flags; and
   a control unit to, when the time counting unit counts a predetermined time period to enter a timeout from a host computer, finish a measuring operation for the reference flags before entering the timeout, wherein
   the control unit causes a robot on standby to take over the conveying operation when the control unit finishes the measuring operation for the reference flag.

9. An alignment adjusting apparatus comprising:
   at least two robots to execute conveying operations of putting and taking an object to be conveyed in and out of an accommodating shelf;
   a reference flag to be installed in the accommodating shelf;
   a cell flag to be installed in a cell of the accommodating shelf; and
   a flag measuring unit to, when abnormality of cell access occurs to one of the robots, switch the robot to another robot to cause said another robot to execute the cell access before measuring the reference flag and, when abnormality of the cell access occurs to two of the robots, measure the cell flag to be handled before measuring the reference flag.

10. The alignment adjusting apparatus of claim 9, wherein
the flag measuring unit determines variation due to aging of the cell and re-measures the cell flag to be handled when an error occurs to each of a plurality of the robots.

11. A library apparatus comprising the alignment adjusting apparatus of claim 9.

12. The library apparatus of claim 11, wherein
the flag measuring unit determines variation due to aging of the cell and re-measures the cell flag to be handled when errors occur to a plurality of the robots.

13. A library apparatus to include a robot that conveys a cartridge, comprising:
an accommodating shelf to accommodate the cartridge;
at least one reference flag to be installed in the accommodating shelf;
a flag measuring unit to measure the reference flag on the robot positioned at the reference flag;
a curving detection unit to detect curving the robot based on an inclination of the robot, the inclination being obtained from result of the measurement by the flag measuring unit; and
an alignment adjusting unit to adjust an alignment shift due to the curving occurring to the robot.

14. The library apparatus of claim 13, further comprising:
an alignment adjusting apparatus of a robot to execute conveying operations of putting and taking an object to be conveyed in and out of the accommodating shelf, wherein
the alignment adjusting apparatus includes at least two of the reference flags, the flag measuring unit, the curving detection unit, and the alignment adjusting unit, and
the inclination of the robot is obtained from a variation of a measured value of each of the reference flags by the flag measuring unit.

15. An alignment adjusting method of a robot to put and take an object to be conveyed in and out of an accommodating shelf, the method comprising:
measuring at least one reference flag on the robot positioned to the reference flag that is installed in the accommodating shelf;
detecting curving the robot based on an inclination of the robot, the inclination being obtained from a measured value obtained at said measuring; and
adjusting an alignment shift due to the curving occurring to the robot.

16. The alignment adjusting method of claim 15, wherein
said measuring sets a measurement condition to trigger the measurement of the reference flag and, when the measurement condition is established, the reference flag is measured.

17. The alignment adjusting method of claim 16, wherein
the measurement condition is established by a lapse of a specific time period from the measurement of the reference flag or occurrence of a handling error to the robot.

18. The alignment adjusting method of claim 15, wherein
the reference flag on the face to be handled is measured based on a first cartridge conveyance order to the robot.

19. The alignment adjusting method of claim 15, wherein
the reference flag on the face to be handled of the accommodating shelf is measured within a specific time period after power is turned on.

20. The alignment adjusting method of claim 15, wherein
the reference flag is measured using a robot on standby of a plurality of the robots, based on a patrolling operation of a robot mechanism unit.

21. The alignment adjusting method of claim 15, wherein
when a predetermined time period to enter a timeout from a host computer connected to a library apparatus elapses, a measuring operation for the reference flag is finished before entering the timeout.

22. The alignment adjusting method of claim 15, wherein
measured values of the reference flags at a plurality of points are captured, and wherein
when a difference between a plurality of the measured values is large, the alignment adjustment is executed using at least two of the measured values.

23. An alignment adjusting method of a robot to put and take an object to be conveyed in and out of an accommodating shelf, the method comprising:
measuring at least one reference flag on the robot positioned to the reference flag that is installed in the accommodating shelf; and
adjusting an alignment shift of the robot corresponding to an inclination of the robot, the inclination being obtained from a measured value obtained at said measuring, wherein
the robot is positioned at a flag that is closest to a current position of the robot and, when a variation of the flag detected is large, the reference flag on a face to be handled that is installed with the flag is measured.

24. An alignment adjusting method for an apparatus to include at least two robots that put and take an object to be conveyed in and out of an accommodating shelf, the method comprising:
switching, when abnormality of cell access occurs, a robot when the abnormality thereof occurs to another robot and causing said another robot to execute the access before measuring a reference flag and, when errors occur to a plurality of the robots, measuring a cell flag to be handled.

25. The alignment adjusting method of claim 24, wherein
said switching and measuring determines variation due to aging of the cell and re-measures the cell flag to be handled, when errors occur to a plurality of the robots.

* * * * *